(12) United States Patent
Brinkmann et al.

(10) Patent No.: US 11,296,571 B2
(45) Date of Patent: Apr. 5, 2022

(54) STATOR FOR A PLANAR MOTOR

(71) Applicant: Beckhoff Automation GmbH, Verl (DE)

(72) Inventors: Rolf Brinkmann, Bad Salzuflen (DE); Lukas Bentfeld, Delbrück (DE); Uwe Prüssmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/112,046

(22) Filed: Dec. 4, 2020

(65) Prior Publication Data

US 2021/0091621 A1 Mar. 25, 2021

Related U.S. Application Data

(63) Continuation of application No. PCT/EP2019/068142, filed on Jul. 5, 2019.

(30) Foreign Application Priority Data

Jul. 25, 2018 (DE) ...................... 10 2018 117 981.2

(51) Int. Cl.
*H02K 3/47* (2006.01)
*H02K 41/03* (2006.01)

(52) U.S. Cl.
CPC ............. *H02K 3/47* (2013.01); *H02K 41/031* (2013.01); *H02K 2201/18* (2013.01)

(58) Field of Classification Search
CPC ..... H02K 2201/18; H02K 3/47; H02K 41/031
See application file for complete search history.

(56) References Cited

U.S. PATENT DOCUMENTS 4,126,797 A 11/1978 Kling
4,458,227 A 7/1984 Petersen
(Continued)

FOREIGN PATENT DOCUMENTS

DE 102017131304 A1 6/2019
DE 102017131314 A1 6/2019
(Continued)

OTHER PUBLICATIONS

International Search Report and Written Opinion of PCT/EP2019/068142 dated Oct. 7, 2019, 36 pages including English translation.
(Continued)

*Primary Examiner* — Naishadh N Desai
(74) *Attorney, Agent, or Firm* — Dorsey & Whitney LLP

(57) ABSTRACT

A stator assembly for driving a rotor of a planar electrical motor includes longitudinal stator layers with first coil conductors and inclined stator layers with second coil conductors. The first coil conductors extend in an elongated manner in a first direction, and the second coil conductors extend in an elongated manner in a second direction, different from the first direction. The longitudinal and inclined stator layers are arranged on top of one another in a third direction, oriented perpendicularly to the first and second direction. An uppermost and lowermost stator layer of the stator assembly are each formed as a longitudinal stator layer with first coil conductors. The longitudinal stator layers are arranged in the third direction at most on one side next to an inclined stator layer, and the inclined stator layers are arranged in the third direction at most on one side next to a longitudinal stator layer.

17 Claims, 18 Drawing Sheets

(56) References Cited

U.S. PATENT DOCUMENTS

| | | |
|---|---|---|
| 6,226,073 B1 | 5/2001 | Emoto |
| 9,202,719 B2 | 12/2015 | Lu et al. |
| 11,038,410 B2 | 6/2021 | Brinkmann et al. |
| 2003/0192686 A1 | 10/2003 | Hisai et al. |
| 2005/0253463 A1* | 11/2005 | Emoto ............... G03F 7/70758 310/12.06 |
| 2006/0220478 A1 | 10/2006 | Emoto |
| 2013/0164687 A1* | 6/2013 | Binnard ................. H02K 9/22 430/322 |
| 2014/0285122 A1 | 9/2014 | Lu et al. |
| 2017/0163140 A1 | 6/2017 | Lu |
| 2017/0179805 A1* | 6/2017 | Lu ........................ H02N 15/00 |
| 2017/0179806 A1 | 6/2017 | Lu |
| 2017/0317569 A1* | 11/2017 | Lu ........................ H02K 41/031 |
| 2020/0303997 A1 | 9/2020 | Brinkmann et al. |
| 2020/0304007 A1 | 9/2020 | Brinkmann et al. |
| 2020/0304008 A1 | 9/2020 | Brinkmann et al. |
| 2020/0304009 A1 | 9/2020 | Brinkmann et al. |
| 2020/0304010 A1 | 9/2020 | Brinkmann et al. |
| 2020/0321846 A1 | 10/2020 | Brinkmann et al. |
| 2021/0091622 A1 | 3/2021 | Brinkmann et al. |
| 2021/0184612 A1 | 6/2021 | Prüssmeier |

FOREIGN PATENT DOCUMENTS

| | | |
|---|---|---|
| DE | 102017131320 A1 | 6/2019 |
| DE | 102017131324 A1 | 6/2019 |
| DE | 102017131326 A1 | 6/2019 |
| DE | 102018117953.7 B3 | 11/2019 |
| DE | 102017131321.4 B4 | 3/2020 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |

OTHER PUBLICATIONS

Examination Report of DE 102018117981.2 dated May 10, 2019, 16 pages including English translation.

* cited by examiner

STATOR FOR A PLANAR MOTOR

CROSS-REFERENCE TO RELATED APPLICATIONS

This patent application is a continuation of International Patent Application PCT/EP2019/068142, filed Jul. 5, 2019, entitled STATOR FOR A PLANAR MOTOR, and claims the priority of German patent application DE 10 2018 117 981.2, filed Jul. 25, 2018, entitled STATOREINHEIT UND STATORMODUL, each of which is hereby incorporated by reference herein, in the entirety and for all purposes.

FIELD

The present invention relates to stator assemblies for an electrical planar motor and to a stator module with a stator assembly for an electrical planar motor.

BACKGROUND

Planar-drive systems having electrical planar motors may, inter alia, be used in automation technology, in particular in production engineering, handling technology and process engineering. Planar-drive systems may be used to move or position a moveable element of a facility or machine in at least two linearly independent directions. Planar-drive systems may comprise a permanently energized electromagnetic planar motor having a planar stator and a rotor which may move on the stator in at least two directions.

In a permanently energized electromagnetic planar motor, a driving force is exerted on the rotor by current-carrying coil conductors magnetically interacting with driving magnets of a magnet arrangement. The present invention in particular relates to embodiments of planar-drive systems in which the drive magnets of an electrical planar motor are arranged on the rotor and the current-carrying coil conductors of the planar motor are arranged in a stationary planar stator.

In such a drive system, the rotor comprises at least a first magnet unit and a second magnet unit and the stator comprises at least a group of energizable first coil conductors and a group of energizable second coil conductors. For driving the rotor, the first coil conductors interact with the first drive magnets and the second coil conductors interact with the second drive magnets. In this context, the first coil conductors may extend in an elongated manner in a first direction and may be embodied to drive the rotor in a direction perpendicular to the first direction by interacting with the first drive magnets. The second coil conductors may extend in an elongated manner in a second direction differing from the first direction and be embodied to drive the rotor in a direction perpendicular to the second direction by interacting with the second drive magnets.

In such planar-drive systems, the coil conductors energizable by the drive current may be arranged in a stator assembly of the stator. The coil conductors may be arranged in several stator layers, the stator layers being arranged on top of one another in a third direction perpendicular to the first and second direction.

The drive currents are fed into the coil conductor of the stator as alternating currents. When driving the rotor of the above-mentioned planar-drive systems, the drive currents are thus modulated or reversed in polarity. In addition, the drive currents may be pulse-width modulated. In particular, the frequency of the pulse-width modulation is selected high enough to ensure a low residual ripple of the drive current on the one hand, and low enough to limit alternating current losses in the current control units generating the drive currents and the coil conductors conducting the drive currents on the other hand.

Publications WO 2013/059934 A1, WO 2015/017933 A1, WO 2015/179962 A1, WO 2015/184553 A1, WO 2015/188281 A1, WO 2017/004716 A1 each describe planar-drive systems (displacement devices) which comprise an electromagnetic planar motor with a permanently energized rotor and a stator comprising several current-carrying conductors.

SUMMARY

The present invention provides an improved stator assemblies and an improved stator module with a stator assembly in which the drive currents in the coil conductors may be modulated or reversed in polarity quickly and with low loss.

According to a first aspect, a stator assembly for driving a rotor of an electrical planar motor comprises longitudinal stator layers having first coil conductors for interacting with first drive magnets of the rotor and inclined stator layers having second coil conductors for interaction with second drive magnets of the rotor. The first coil conductors extend in an elongated manner in a first direction. The second coil conductors extend in an elongated manner in a second direction different from the first direction. The longitudinal stator layers and the inclined stator layers being arranged on top of one another in a third direction oriented perpendicularly to the first and second directions. An uppermost stator layer of the stator assembly and a lowermost stator layer of the stator assembly are each embodied as a longitudinal stator layer having first coil conductors. The longitudinal stator layers are arranged in the third direction at most on one side next to an inclined stator layer. The inclined stator layers are arranged in the third direction at most on one side next to a longitudinal stator layer.

According to a second aspect, the stator assembly for driving a rotor of an electrical planar motor comprises at least two longitudinal stator layers having first coil conductors for interacting with first drive magnets of the rotor and at least three inclined stator layers having second coil conductors for interacting with second drive magnets of the rotor. The first coil conductors extend in an elongated manner in a first direction. The second coil conductors extend in an elongated manner in a second direction different from the first direction. The longitudinal stator layers and the inclined stator layers being arranged on top of one another in a third direction oriented perpendicularly to the first and second directions. All longitudinal stator layers are arranged next to each other in the third direction and all inclined stator layers are arranged next to each other in the third direction, so that each inclined stator layer is in the third direction arranged at most on one side next to a longitudinal stator layer and each longitudinal stator layer is in the third direction arranged at most on one side next to an inclined stator layer.

According to a second aspect, the stator module for an electrical planar motor has a stator assembly for driving a rotor. The stator assembly comprises longitudinal stator layers having first coil conductors for interacting with first drive magnets of the rotor and inclined stator layers having second coil conductors for interacting with second drive magnets of the rotor. The first coil conductors extend in an elongated manner in a first direction. The second coil conductors extend in an elongated manner in a second direction different from the first direction. The longitudinal stator layers and the inclined stator layers being arranged on top of one another in a third direction oriented perpendicularly to the first and second direction. An uppermost stator layer of the stator assembly and a lowermost stator layer of the stator assembly are each formed as a longitudinal stator layer having first coil conductors. The longitudinal stator layers are arranged in the third direction at most on one side next to an inclined stator layer. The inclined stator layers are arranged in the third direction at most on one side next to a stator longitudinal length.

EXAMPLES

A stator assemblies for a planar motor comprises several longitudinal stator layers having first coil conductors extending in an elongated manner in a first direction and several inclined stator layers having second coil conductors extending in an elongated manner in a second direction different from the first direction and in which the longitudinal stator layers and the inclined stator layers are arranged on top of one another in a third direction oriented perpendicularly to the first and second direction.

Under certain circumstances high parasitic capacitances or reactive resistances may occur in such a stator assembly. These parasitic capacitances may lead to high losses and limit the maximum switching frequency when the coil conductors are charged with alternating currents.

It was recognized that the parasitic capacitance of the inclined stator layers or the longitudinal stator layers is the higher the more longitudinal stator layers are placed in the third direction next to an inclined stator layer and vice versa. From this it was concluded that a particularly low capacitance of the arrangement of inclined and longitudinal stator layers may be achieved by positioning as few longitudinal stator layers as possible next to an inclined stator layer and vice versa. The extent to which this is possible, however, may depend on further boundary conditions for the arrangement of the inclined stator layers and longitudinal stator layers.

A stator assembly for driving a rotor of an electrical planar motor comprises longitudinal stator layers having first coil conductors for interacting with first drive magnets of the rotor and inclined stator layers having second coil conductors for interacting with second drive magnets of the rotor. The first coil conductors extend in an elongated manner in a first direction and the second coil conductors extend in an elongated manner in a second direction differing from the first direction. The longitudinal stator layers and the inclined stator layers are arranged on top of one another in a third direction perpendicular to the first and second direction. Thereby, an uppermost stator layer of the stator assembly and a lowermost stator layer of the stator assembly are each embodied as longitudinal stator layers having first coil conductors. In the third direction, the longitudinal stator layers are in the third direction arranged at most on one side next to an inclined stator layer and the inclined stator layers are arranged at most on one side next to a longitudinal stator layer.

In the third direction, the stator assembly has a particularly low number of stator-layer changes in which the orientation of the coil conductors changes. In particular, inner layers of the stator assembly which are arranged between the uppermost and the lowermost stator layer in the third direction each adjoin a stator layer at most on one side in the third direction, the coil conductors of said stator layer having a different orientation than the coil conductors of the respective inner layer. At least on the other side the inner layers are adjacent to a stator layer, the coil conductors of which have the same orientation as the coil conductors of the inner layer at issue. This leads to a particularly low capacitance of the arrangement of first and second coil conductors.

In the stator assembly, the inner layers embodied as longitudinal stator layers may be arranged next to each other in pairs and between two inclined stator layers, and the inner layers embodied as inclined stator layers may be arranged next to each other in pairs and between two longitudinal stator layers.

In the stator assembly, an inclined stator layer may in the third direction be arranged next to each stator layer embodied as a longitudinal stator layer, and a longitudinal stator layer may in the third direction be arranged next to each stator layer embodied as an inclined stator layer. As a result, the stator assembly may in particular comprise several carrier plates arranged on top of one another in the third direction, on one side of which a longitudinal stator layer is arranged and on the other side of which an inclined stator layer is arranged. Since in the stator assembly, the uppermost stator layer and the lowermost stator layer are embodied as longitudinal stator layers, the arrangement of the longitudinal stator layers and of the inclined stator layers may be arranged symmetrically in the third direction around a shared center plane of the longitudinal stator layers and inclined stator layers. In addition, the longitudinal stator layers and the inclined stator layers may have the same mean distance from a stator surface of the stator assembly. In total, the stator assembly thus solves the afore-mentioned object, in particular under the boundary conditions that a longitudinal stator layer is arranged next to each inclined stator layer and an inclined stator layer is arranged next to each longitudinal stator layer and/or that the arrangement of the longitudinal stator layers and of the inclined stator layers in the third direction is symmetrical around a shared center plane and/or that the longitudinal stator layers and the inclined stator layers have the same mean distance from the stator surface of the stator assembly.

In a further embodiment of the stator assembly, a second uppermost stator layer of the stator assembly and a second lowermost stator layer of the stator assembly are each embodied as inclined stator layers having second coil conductors. As a result, an inclined stator layer is arranged in the third direction next to the uppermost stator layer embodied as a longitudinal stator layer and next to the lowermost stator layer embodied as a longitudinal stator layer. As a result, the uppermost and the second uppermost stator layer may be arranged on opposite sides of a two-layer carrier plate so that the carrier plate has first coil conductors extending on one side in the first direction and second coil conductors extending on the opposite side in the second direction.

In such a carrier plate, the first coil conductors may easily be electrically conductively connected to each other by horizontal connecting structures arranged on the side of the carrier plate opposite to the first coil conductors. In addition, the second coil conductors may be electrically connected to each other in a simple manner by horizontal connecting structures arranged on the side of the carrier plate opposite to the second coil conductors.

In a further embodiment, the stator assembly comprises a first longitudinal stator layer and a second longitudinal stator layer, as well as a first inclined stator layer and a second inclined stator layer. The stator assembly further comprises a first carrier plate extending in the first and second direction and a second carrier plate extending in the first and second direction. On a first side of the first carrier plate, the first longitudinal stator layer is arranged and on a second side of the first carrier plate opposite to the first side of the first carrier plate in the third direction, the first inclined stator layer is arranged. On a first side of the second carrier plate, the second longitudinal stator layer is arranged and on a second side of the second carrier plate opposite to the first side of the first carrier plate in the third direction, the second inclined stator layer is arranged. The second carrier plate is arranged next to the first carrier plate in the third direction and aligned in in parallel to the first carrier plate, and the second side of the first carrier plate is arranged facing the second side of the second carrier plate.

A stator assembly, the stator layers of which are arranged on two-sided carrier plates may be manufactured particularly easily and cost-effectively. By arranging the second coil conductors arranged on the second side of the second carrier plate next to the second coil conductors arranged on the second side of the first carrier plate, the second coil conductors extending in an elongated manner in the second direction adjoin first coil conductors extending in an elongated manner in the first direction on only one side in the third direction. Thus, the arrangement of second coil conductors has a particularly low capacitance.

The first carrier plate and the second carrier plate each have a longitudinal stator layer on their first sides and an inclined stator layer on their second sides. As a result, the first coil conductors of the longitudinal stator layers may be easily connected to each other in a simple manner by horizontal connecting structures arranged on the inclined stator layers. In addition, the inclined stator layers may be electrically connected to each other in a simple manner by horizontal connecting structures arranged on the longitudinal stator layers.

In a further embodiment of the stator assembly, the first carrier plate comprises a first vertical connecting structure and the second carrier plate comprises a second vertical connecting structure. The first vertical connecting structure extends from the first side of the first carrier plate to the second side of the first carrier plate in the third direction and connects a first coil conductor arranged on the first side of the first carrier plate to a first conductor structure arranged on the second side of the first carrier plate in an electrically conductive manner. The second vertical connecting structure extends from the second side of the second carrier plate to the first side of the second carrier plate in the third direction and connects a first coil conductor arranged on the first side of the second carrier plate to a second conductor structure arranged on the second side of the second carrier plate in an electrically conductive manner.

With the first vertical connecting structure and the second vertical connecting structure, the first and second sides of the first carrier plate and the first and second sides of the second carrier plate may be connected to one another in a particularly space-saving manner. The first vertical connecting structure and the second vertical connecting structure may be arranged on top of one another, particularly in the third direction. The first vertical connecting structure may in the third direction in particular terminate on the first side of the first carrier plate and on the second side of the first carrier plate. In addition, the second vertical connecting structure may in the third direction also particularly terminate on the first side of the second carrier plate and on the second side of the second carrier plate, respectively. In particular, the first vertical connecting structure does not protrude over the first carrier plate in the third direction and the second vertical connecting structure does not protrude over the second carrier plate in the third direction. The first and second vertical connecting structures may particularly be embodied as buried vias or blind vias.

The first and second conducting structure may extend in an elongated manner in the second direction and may be aligned in in parallel to the second coil conductors on the second side of the first and second carrier plate. This allows the first and second horizontal connecting structure to be arranged on the second sides of the first and second carrier plate in a particularly space-saving manner.

In a further embodiment of the stator assembly, the stator assembly includes a third vertical connecting structure, wherein the third vertical connecting structure electrically conductively connects a first coil conductor arranged on the first side of the first carrier plate to a third conducting structure arranged on the second side of the second carrier plate. With the third vertical connecting structure, the coil conductors arranged on the first carrier plate may be electrically conductively connected to the coil conductors arranged on the second carrier plate in a simple manner.

In a further embodiment of the stator assembly, the third vertical connecting structure comprises a through-hole extending in the third direction from an upper side of the stator assembly to a bottom side of the stator assembly. A vertical connecting structure of this type may be produced particularly easily. For example, the through-hole may be drilled in a drilling process that penetrates the entire stator assembly after the first and second carrier plates have been arranged. The through-hole may have a conductively coated wall and/or be filled with an electrically conductive material.

In a further embodiment of the stator assembly, the stator assembly comprises further carrier plates extending in the first and second direction, the further carrier plates each having a first side and a second side opposite to the first side in the third direction. A longitudinal stator layer is arranged on the first side of each of the further carrier plates and an inclined stator layer is arranged on the second side of each of the further carrier plates. The first carrier plate, the second carrier plate and the further carrier plates are arranged next to each other in the third direction and aligned in in parallel to each other. In the third direction, facing sides of the adjacent carrier plates are alternatingly embodied as first sides facing each other or as second sides facing each other.

The stator assembly may be produced in a simple manner by constructing the stator assembly from carrier plates arranged on top of one another in the third direction, each with a first stator layer and a second stator layer. By embodying facing sides of the carrier plates arranged side by side alternatingly in the third direction as facing first sides or as facing second sides, the boundary surfaces of the facing first sides of the carrier plates and the boundary surfaces of the facing second sides of the carrier plates do not contribute to the capacitance of the stator-layer arrangement and the stator-layer arrangement has a particularly low capacitance.

The first coil conductors on the first sides of the carrier plates may each be electrically conductively connected to one another by horizontal connecting structures arranged on the second sides of the carrier plates. The horizontal connecting structures on the second sides of the carrier plates may extend in an elongated manner in the second direction and run in in parallel to the second coil conductors on the second side of the carrier plates. Conversely, the second coil conductors on the second sides of the carrier plates may each be electrically connected to each other by horizontal connecting structures arranged on the first sides of the carrier plates. The horizontal connecting structures on the first sides of the carrier plates may extend in an elongated manner in the first direction and run in in parallel to the first coil conductors on the first side of the carrier plates.

A further embodiment of the stator assembly comprises at least two longitudinal stator layers having first coil conductors and at least three inclined stator layers having second coil conductors. In this context, all inclined stator layers are arranged next to one another in the third direction. A first part of the longitudinal stator layers is arranged above the inclined stator layers in the third direction and a second part of the longitudinal stator layers is arranged below the inclined stator layers in the third direction, so that only two of the inclined stator layers are arranged next to a longitudinal stator layer.

Such a stator assembly has only two boundary surfaces at which second coil conductors extending in the second direction are arranged in the third direction next to first coil conductors extending in the first direction. Thus, only these two boundary surfaces contribute to the capacitance of the arrangement of second coil conductors and to the capacitance of the arrangement of first coil conductors. This means that a particularly low capacitance of the first and second coil conductors may be achieved and the drive currents in the first and second coil conductors may be switched particularly quickly and with low loss.

The stator assembly, in which at least three inclined stator layers are arranged next to one another in the third direction and between a first part and a second part of the longitudinal stator layers, makes it possible to arrange the stator layers in the third direction in such a way that the longitudinal stator layers and the inclined stator layers have the same mean distance from a stator surface of the stator assembly. In particular, the longitudinal stator layers and the inclined stator layers may be arranged symmetrically around a shared center plane of the longitudinal stator layers and the inclined stator layers. In a stator assembly in which at least three inclined stator layers are arranged next to one another in the third direction, the stator assembly cannot be constructed exclusively from carrier plates in which an inclined stator layer is arranged on one side of the carrier plates and a longitudinal stator layer is arranged on an opposite side of the carrier plates. Such a stator assembly therefore solves the above-mentioned object in particular under the boundary condition that the longitudinal and inclined stator layers have the same mean distance from a stator surface of the stator assembly, but the stator assembly does not have to be constructed exclusively from carrier plates on one side of which a longitudinal stator layer is arranged and on the other side of which an inclined stator layer is arranged.

In a further embodiment of the stator assembly, the first part of the longitudinal stator layers and the second part of the longitudinal stator layers comprise an equal number of longitudinal stator layers. In this way, the longitudinal stator layers may be arranged symmetrically in the third direction around a central plane of the longitudinal stator layers so that the stator assembly has a particularly simple structure.

In a further embodiment of the stator assembly, the first direction and the second direction are oriented perpendicular with regard to each other. This results in a particularly simple arrangement of the first and second coil conductors of the stator assembly. In particular, the first coil conductors extending in an elongated manner in the first direction may be arranged side by side in the second direction and embodied to drive the rotor of the planar motor in the second direction. The second coil conductors extending in an elongated manner in the second direction may be arranged side by side in the first direction and may be embodied to drive the rotor in the first direction.

In a further embodiment of the stator assembly, the longitudinal stator layers and the inclined stator layers have the same mean distance from a stator surface of the stator assembly in the third direction. As a result, the same drive currents in the first and second coil conductors also exert the same driving forces onto the rotor in the first and second direction, and the rotor may be driven in both the first and second direction with particular efficiency and low current consumption. Such a stator assembly is particularly flexible and covers a wide range of possible applications.

In a further embodiment of the stator assembly, a first total number of longitudinal stator layers corresponds to a second total number of inclined stator layers. This makes it possible to supply the first coil conductors of the longitudinal stator layers and the second coil conductors of the inclined stator layers with a particularly constant current.

In a further embodiment of the stator assembly, the first coil conductors are arranged on top of one another and in in parallel to each other in the third direction and the second coil conductors are arranged on top of one another and in in parallel to each other in the third direction. In particular, the outer edges of first coil conductors arranged on top of one another are arranged flush on top of one another in a direction perpendicular to the first direction and the outer edges of second coil conductors arranged on top of one another are arranged flush on top of one another in a direction perpendicular to the second direction. The arrangement of second coil conductors thus has a particularly low capacitance.

In a further embodiment of the stator assembly, first coil conductors arranged on top of one another in the third direction are electrically connected to each other in such a way that the same coil current flows in the first coil conductors arranged on top of one another. In addition, second coil conductors arranged on top of one another in the third direction are electrically conductively connected to each other in such a way that the same coil current flows in the second coil conductors arranged on top of one another. As a result, the first coil conductors arranged on top of one another and the second coil conductors arranged on top of one another are each at the same potential and the interfaces between adjacent longitudinal stator layers and the interfaces between adjacent inclined stator layers do not contribute to the capacitance of the arrangement of second coil conductors. The coil currents in first coil conductors arranged on top of one another and the coil currents in second coil conductors arranged on top of one another may be different.

In a further embodiment of the stator assembly, the first coil conductors arranged on top of one another and the second coil conductors arranged on top of one another are each electrically connected in series. This allows for applying the same coil current to the first coil conductors and the same coil current to the second coil conductors in a simple manner.

Moreover, a stator assembly for driving a rotor of an electrical planar motor is provided wherein the stator assembly comprises at least two longitudinal stator layers having first coil conductors and at least three inclined stator layers having second coil conductors. Therein, the first coil conductors extend in an elongated manner in a first direction and the second coil conductors extend in an elongated manner in a second direction different from the first direction. The longitudinal stator layers and the inclined stator layers are arranged on top of one another in a third direction oriented perpendicular to the first and second directions. All the longitudinal stator layers are arranged next to each other in the third direction and all the inclined stator layers are arranged next to each other in the third direction so that only one of the longitudinal stator layers is arranged next to one of the inclined stator layers.

Such a stator assembly only has a single boundary surface in the third direction, at which the first coil conductors of the longitudinal stator layers and the second coil conductors of the inclined stator layers are adjacent to each other. This means that the arrangement of first coil conductors and the arrangement of second coil conductors has a particularly low capacitance.

In a stator assembly in which all longitudinal and inclined stator layers are arranged next to each other in the third direction, the longitudinal and inclined stator layers do not have a shared center plane or the same mean distance from a stator surface of the stator assembly. In addition, the stator assembly cannot be constructed from carrier plates on one side of which a longitudinal stator layer is arranged and on the other side of which an inclined stator layer is arranged. Therefore, the stator assembly, in which all the longitudinal and inclined stator layers are arranged next to each other in the third direction, solves the object mentioned above if the longitudinal and inclined stator layers do not have to have the same mean distance from a stator surface of the stator assembly and the stator assembly does not have to be built up of carrier plates on one side of which a longitudinal stator layer and on the other side of which an inclined stator layer is arranged.

A stator module for an electrical planar motor comprises a stator assembly, the stator assembly comprising longitudinal stator layers having first coil conductors for interacting with first drive magnets of the rotor and inclined stator layers having second coil conductors for interacting with second drive magnets of the rotor. The first coil conductors extend in an elongated manner in a first direction and the second coil conductors extend in an elongated manner in a second direction different from the first direction. The longitudinal stator layers and the inclined stator layers are arranged on top of one another in a third direction perpendicular to the first and second directions. An uppermost stator layer of the stator assembly and a lowermost stator layer of the stator assembly are in this context each embodied as longitudinal stator layers having first coil conductors. In the third direction, the longitudinal stator layers are arranged on no more than one side next to an inclined stator layer and in the third direction, the inclined stator layers are arranged on no more than one side next to a longitudinal stator layer.

In the third direction, the stator assembly of the stator module comprises a particularly low number of stator-layer changes in which the orientation of the coil conductors changes. In particular, inner layers of the stator assembly which are arranged in the third direction between the uppermost and the lowermost stator layer each adjoin a stator layer with a different orientation of the coil conductors at most on one side in the third direction, while they adjoin a stator layer with the same orientation of the coil conductors at least on the other side. This leads to a particularly low capacitance of the arrangement of first and second coil conductors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention relates to further developments of the planar-drive systems disclosed in publications WO 2013/059934 A1, WO 2015/017933 A1, WO 2015/179962 A1, WO 2015/184553 A1, WO 2015/188281 A1 and WO 2017/004716 A1. The disclosure content of the six publications mentioned above is herewith made the subject matter of this description to its full extent by reference.

Furthermore, the invention relates to further developments of the planar-drive systems disclosed in German patent applications DE 10 2017 131 304.4, DE 10 2017 131 314.1, DE 10 2017 131 320.6, DE 10 2017 131 321.4, DE 10 2017 131 324.9, DE 10 2017 131 326.5 and DE 10 2018 117 953.7. The disclosure content of all aforementioned German patent applications is also made the subject matter of the present description to its full extent, and incorporated by reference herein, in the entirety and for all purposes.

Figure 1:
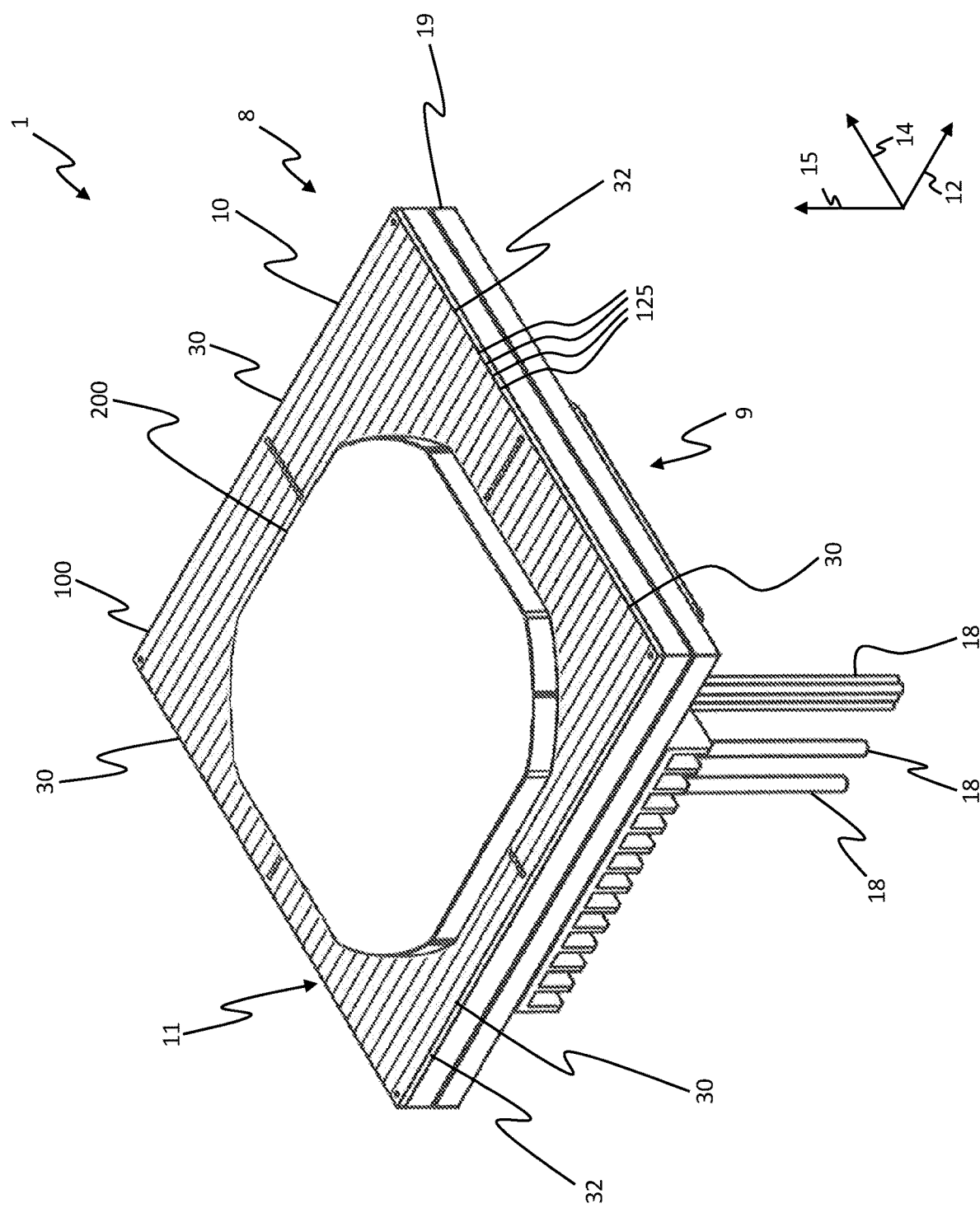
FIG. 1 shows a perspective view from above of a planar-drive system with a stator module and a rotor.

FIG. 1 shows a perspective view from above onto a planar-drive system 1 having a stator module 10 and a rotor 200. The stator module 10 comprises a module housing 19 and a stator assembly 100. The stator module 10 has an upper side 8 and a bottom side 9 opposite to the upper side 8. The stator assembly 100 is arranged above the module housing 19 and on the upper side 8 of the stator module 10 in a third or vertical direction 15 oriented from the bottom side 9 to the upper side 8. The stator assembly 100 is embodied as a planar stator and has a flat, i.e. planar, stator surface 11 on the upper side 8 of the stator module 10. The stator surface 11 simultaneously forms a surface of the stator module 10.

The stator surface 11 is oriented perpendicularly to the third direction 15 and extends over the entire upper side 8 of the stator assembly 100 and of the stator module 10. The stator assembly 100 comprises at least one first coil conductor 125 on the stator surface 11 which may be energized with a drive current. As shown, the stator assembly 100 may have a plurality of first coil conductors 125 on the stator surface 11. The first coil conductors 125 may each be charged with a drive current. With the drive currents in the first coil conductors 125, a magnetic field may be generated which drives the rotor 200 in interaction with drive magnets of the rotor 200. The rotor 200 and the stator assembly 100 with the current-carrying first coil conductors 125 form an electromagnetic planar motor.

In operation, the rotor 200 is movably arranged above the stator surface 11 of the stator module 10 and may be driven in a first direction 12 as well as in a second direction 14. The first 12 direction and the second direction 14 differ from each other and are linearly independent. In particular, the first direction 12 and the second direction 14 may, as shown in FIG. 1, be aligned perpendicularly with regard to each other. The first direction 12 and the second direction 14 are each oriented in in parallel to the stator surface 11 and perpendicularly to the third direction 15. By driving the rotor 200 simultaneously in the first direction 12 and in the second direction 14, the rotor 200 may be driven in any direction over the stator surface 11. In operation, the rotor 200 may be kept floating above the stator surface 11 in the third direction 15, e.g. by the drive magnets and suitable drive currents magnetically interacting in the first coil conductors 125. Apart from driving the rotor 200 in the first and second directions 12, 14, it is also possible to drive it in the third, vertical direction 15.

The stator surface 11 is rectangular. In particular, the stator surface 11 may be square, as shown. The stator surface 11 is limited by four straight outer edges 30. Two opposite outer edges 30 are respectively oriented in in parallel to the first direction 12 and two opposite other outer edges 30 are oriented in in parallel to the second direction 14.

An extension of the stator assembly 100 in the third direction 15 is smaller than an extension of the stator assembly 100 in the first and second directions 12, 14. The stator assembly 100 thus forms a flat cuboid extending in the first and second directions 12, 14 or a plate extending in the first and second directions 12, 14. Between the stator surface 11 and a bottom side of the stator assembly 100 opposite to the stator surface 11, the stator assembly 100 has four plane side faces 32 which are flush with the outer edges 30 of the stator surface 11. The side faces 32 of the stator assembly 100 are oriented perpendicularly with regard to the stator surface 11.

Like the stator surface 11 and the stator assembly 100, the module housing 19 is rectangular when viewed from above the stator surface 11. The module housing 19 is square, particularly in a top view onto the stator surface 11. The module housing 19 is embodied as a flat cuboid or as a plate, the extension of the module housing 19 in the third direction 15 being smaller than in the first and second direction 12, 14. An upper side of the module housing 19 facing the stator assembly 100 is arranged adjacent to the bottom side of the stator assembly 100. In the first and second direction 12, 14, the stator assembly 100 and the module housing 19 have essentially the same dimensions.

While the stator module 10 is flat on its surface formed by the stator surface 11, the stator module 10 may not be even or, respectively, uneven on the bottom side 9 of the stator module 10 opposite to the stator surface 11. In particular, further components may be arranged at the module housing 19 or the stator module 10 on the bottom side 9 of the stator module 10 or on the bottom side of the module housing 19. In the first direction 12 or in the second direction 14, these further components reach at most up to the outer edges 30 of the stator assembly 100, so that the further components do not project over the outer edges 30 of the stator assembly 100 in the first or the second direction 12, 14.

On the bottom side of the module housing 19, connections are arranged for connecting the stator module 10 with several connecting lines 18. The connecting lines 18 may, for example, comprise an input line of a data network, an output line of the data network and a power-supply line for supplying the stator module 10 with electrical energy. In particular, electrical energy for generating the drive currents may be supplied to the stator module 10 via the power-supply line. The stator module 10 may be connected to a control unit of the planar-drive system 1 via the data network and exchange control data with the control unit for controlling the rotor 200.

The stator surface 11 may in the first direction 12 have an extension between 100 mm and 500 mm, in particular between 120 mm and 350 mm, in particular 240 mm. The stator surface 11 may in the second direction 14 have an extension between 100 mm and 500 mm, in particular between 120 mm and 350 mm, in particular 240 mm. In the third direction 15, the stator module 10 may have an extension between 10 mm and 100 mm, in particular between 15 mm and 60 mm, in particular of 30 mm. In the third direction 15, the module housing 19 may have an extension between 8 mm and 80 mm, in particular between 13 mm and 55 mm, in particular 26.6 mm. The module housing 19 may have the same extension in the first and/or second direction 12, 14 as the stator surface 11. The stator assembly 100 may have an extension of 1 mm to 10 mm, in particular of 2 mm to 5 mm, in particular of 3.5 mm to 4.5 mm, in particular of 3.7 mm to 4 mm in the third direction 15.

Several versions of the stator module 10 may be arranged next to one another in such a way that the outer edges 30 of adjacent stator modules 10 abut on one another and the stator surfaces 11 of the stator modules 10 form a continuous working surface over which the rotor 200 may be moved without interruption.

Figure 2:
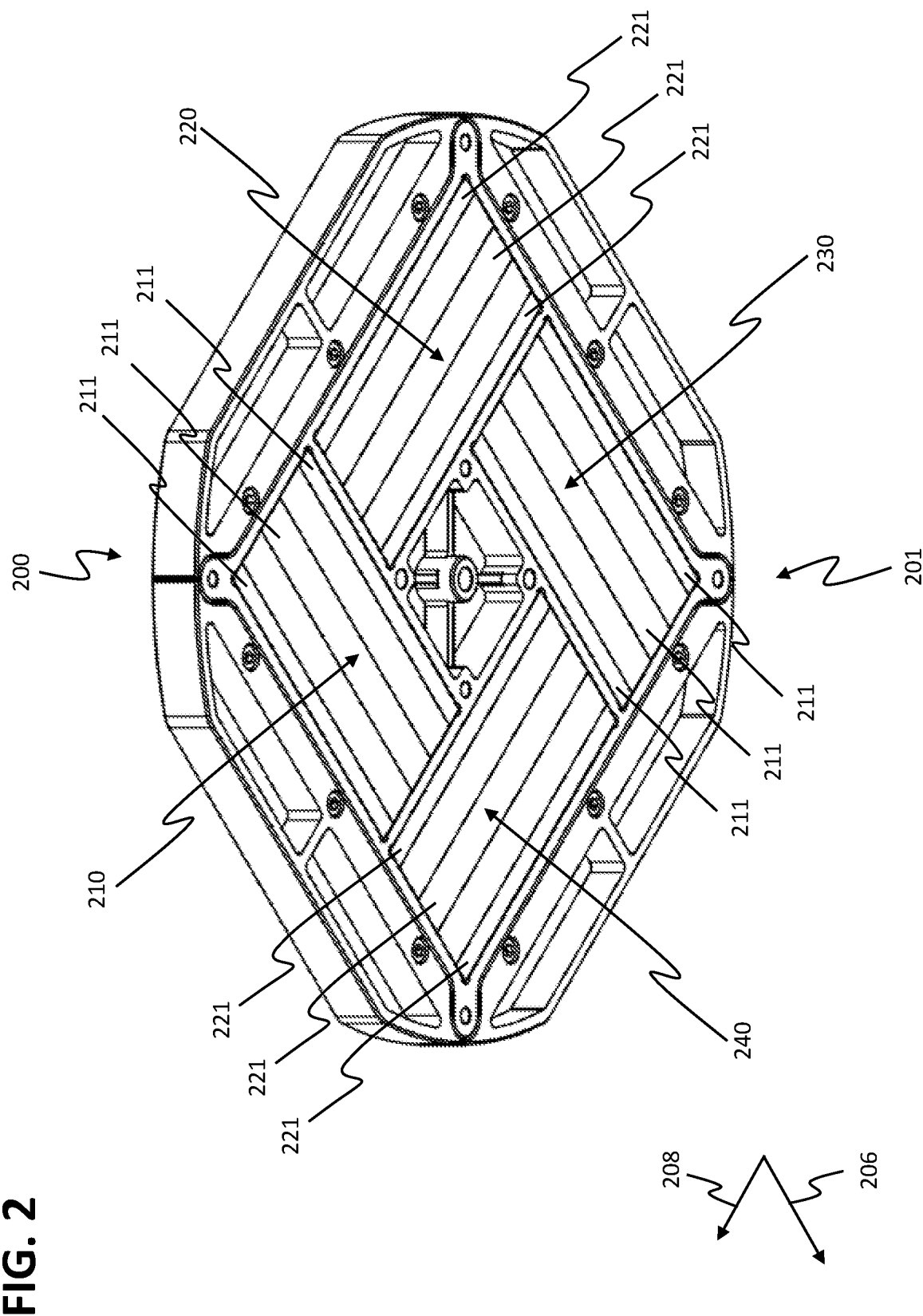
FIG. 2 shows a perspective view from below of the rotor of the planar-drive system with a magnet arrangement.

FIG. 2 shows the rotor 200 of the planar-drive system 1 in a perspective view from below of a bottom side of the rotor 200. During operation of the planar-drive system 1, the bottom side of the rotor 200 is arranged facing the stator surface 11 of the stator module 10. The rotor 200 has a magnet arrangement 201 on the bottom side. The magnet arrangement 201 is rectangular, in particular square, and comprises several magnets. The bottom side of the rotor 200 is flat or planar, in particular in the area of the magnets of magnet arrangement 201. During operation, the bottom side of the rotor 200 with the magnet arrangement 201 is oriented essentially in in parallel to the stator surface 11 and is arranged facing the stator surface 11.

The magnet arrangement 201 comprises a first magnet unit 210, a second magnet unit 220, a third magnet unit 230, and a fourth magnet unit 240. The first magnet unit 210 and the third magnet unit 230 each have first drive magnets 211 extending in an elongated manner in a first rotor direction and arranged side by side along a second rotor direction oriented perpendicularly to the first rotor direction 206. In particular, the first and third magnet units 210, 230 may each have three first drive magnets 211. The second magnet unit 220 and the fourth magnet unit 240 each have second drive magnets 221 arranged side by side in the first rotor direction 206 and extending in an elongated manner along the second rotor direction 208. In particular, the second and fourth magnet units 220 and 240 may each have three second drive magnets 221.

The first and third magnet units 210, 230 are in operation used to drive the rotor 200 in the second rotor direction 208 and the second and fourth magnet units 220, 240 are used to drive the rotor 200 in the first rotor direction 206. The first drive magnets 211 of the first and third magnet unit 210, 230 and the second drive magnets 221 of the second and fourth magnet unit 220, 240 are each magnetized perpendicular to the first and second rotor direction 206, 208. Thereby, adjacent drive magnets 211, 221 of the magnet units 210, 220, 230, 240 each have opposite magnetizations.

Figure 3:
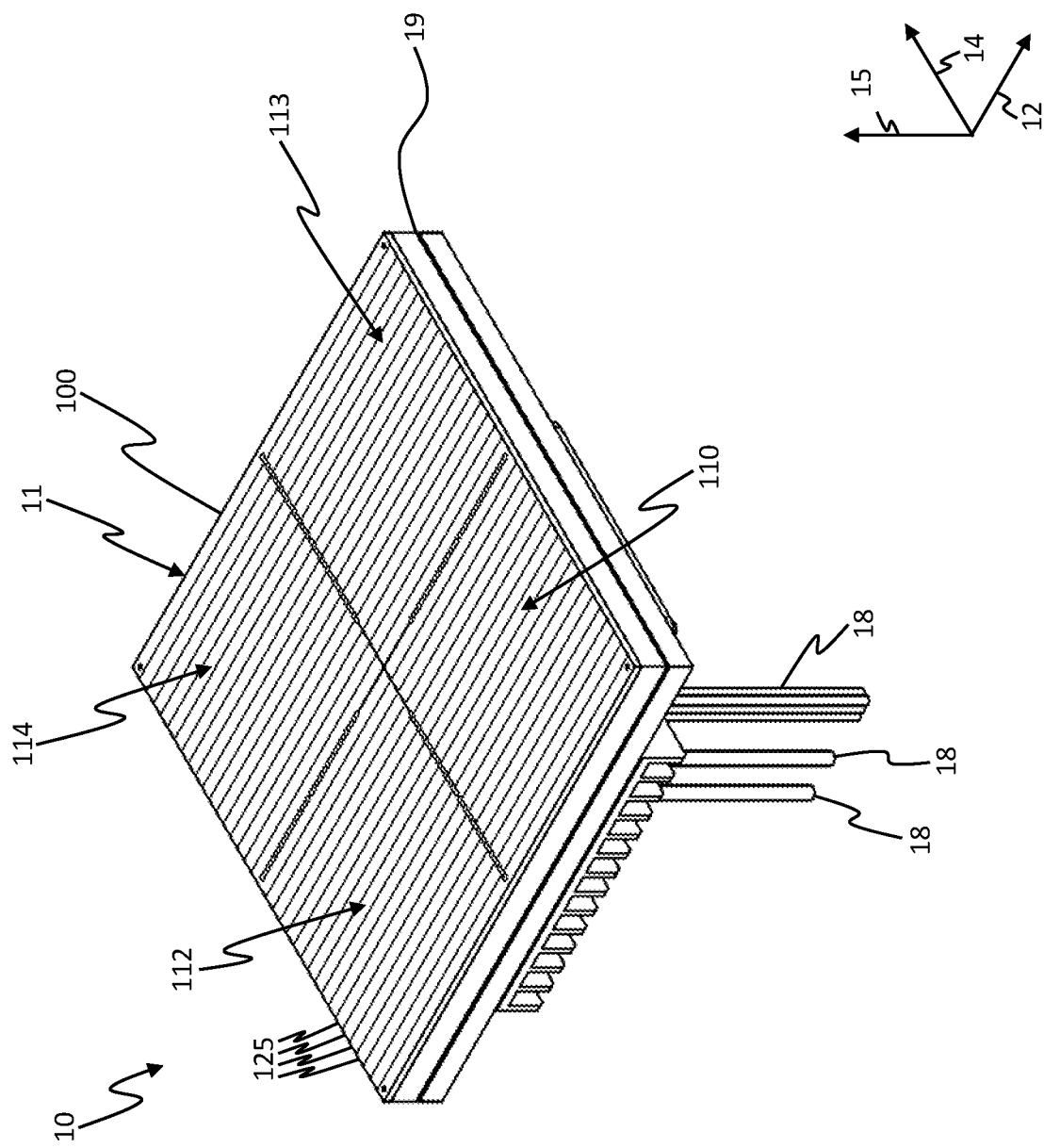
FIG. 3 shows a perspective top view of the stator module of the planar-drive system.

FIG. 3 shows the stator module 10 of the planar-drive system 1 in a perspective view from above without the rotor 200. The stator assembly 100 of the stator module 10 comprises a first stator sector 110, a second stator sector 112, a third stator sector 113 and a fourth stator sector 114. The stator sectors 110, 112, 113, 114 each in turn comprise a part of the first coil conductors 125 arranged at the stator surface 11 of the stator assembly 100. Each of the first coil conductors 125 at the stator surface 11 is fully arranged in one of the stator sectors 110, 112, 113, 114. The stator sectors 110, 112, 113, 114 are rectangular. In particular, the stator sectors 110, 112, 113, 114 may be square so that an extension of the stator sectors 110, 112, 113, 114 in the first direction 12 corresponds to an extension of the stator sectors 110, 112, 113, 114 in the second direction 14.

The stator sectors 110, 112, 113, 114 are arranged in the first direction 12 in two rows positioned next to each other and in the second direction 14, as well, in two adjacent rows positioned next to each other. The stator sectors 110, 112, 113, 114 of adjacent rows are positioned next to each other, as well. In the first direction 12, the stator assembly 100 comprises a row with the second stator sector 112 and the first stator sector 110 and a further row with the fourth stator sector 114 and the third stator sector 113. In the second direction 14, the stator assembly 100 comprises a row with the first stator sector 110 and the third stator sector 113 and a further row with the second stator sector 112 and the fourth stator sector 114.

The stator sectors 110, 112, 113, 114 each have an extension in the first direction 12 and in the second direction 14 which is half the extension of the stator assembly 100 or, respectively, the extension of the stator module 10 in the corresponding direction 12, 14. The boundaries of the stator sectors 110, 112, 113, 114 thus extend in the first and in the second direction 12, 14 in each case in the center of the stator assembly 100 and intersect in the center of the stator assembly 100. The stator sectors 110, 112, 113, 114 each comprise a quarter of the area, i.e. a quadrant, of the stator assembly 100.

In the stator assembly 100 of stator module 10 shown in FIG. 3, the stator layer on the stator surface 11 only comprises first coil conductors 125 which extend in an elongated manner along the first direction 12 and are arranged side by side and adjacent to each other along a direction perpendicular to the first direction 12. If the first direction 12 and the second direction 14 are oriented perpendicularly to each other as shown in FIG. 3, the first coil conductors 125 are arranged side by side and adjoining each other along the second direction 14.

In addition to the first coil conductors 125 shown in FIG. 3, the stator assembly 100 comprises the second coil conductor. The second coil conductors extend in an elongated manner along the second direction 14 and are arranged side by side and adjacent to each other in a direction perpendicular to the second direction 14. If the second direction 14 and the first direction 12 are perpendicular to each other, the second coil conductors are arranged next to each other and adjoining each other along the first direction 12.

Within the stator sectors 110, 112, 113, 114, the first coil conductors 125 and the second coil conductors are arranged in several stator layers or stator planes arranged on top of one another, each of the stator layers comprising either first coil conductors 125 or second coil conductors, but not both first coil conductors 125 and second coil conductors 126. Apart from the extension of the first coil conductors 125 and the second coil conductors and unless differences are described in the following, the stator sectors 110, 112, 113, 114 are identically formed on the different stator layers.

The stator layer visible in FIG. 3 on the stator surface 11 forms a first stator layer of the stator assembly 100. In the third direction 15 below the first stator layer, the stator assembly 100 comprises at least a second stator layer, a third stator layer and a fourth stator layer.

Figure 4:
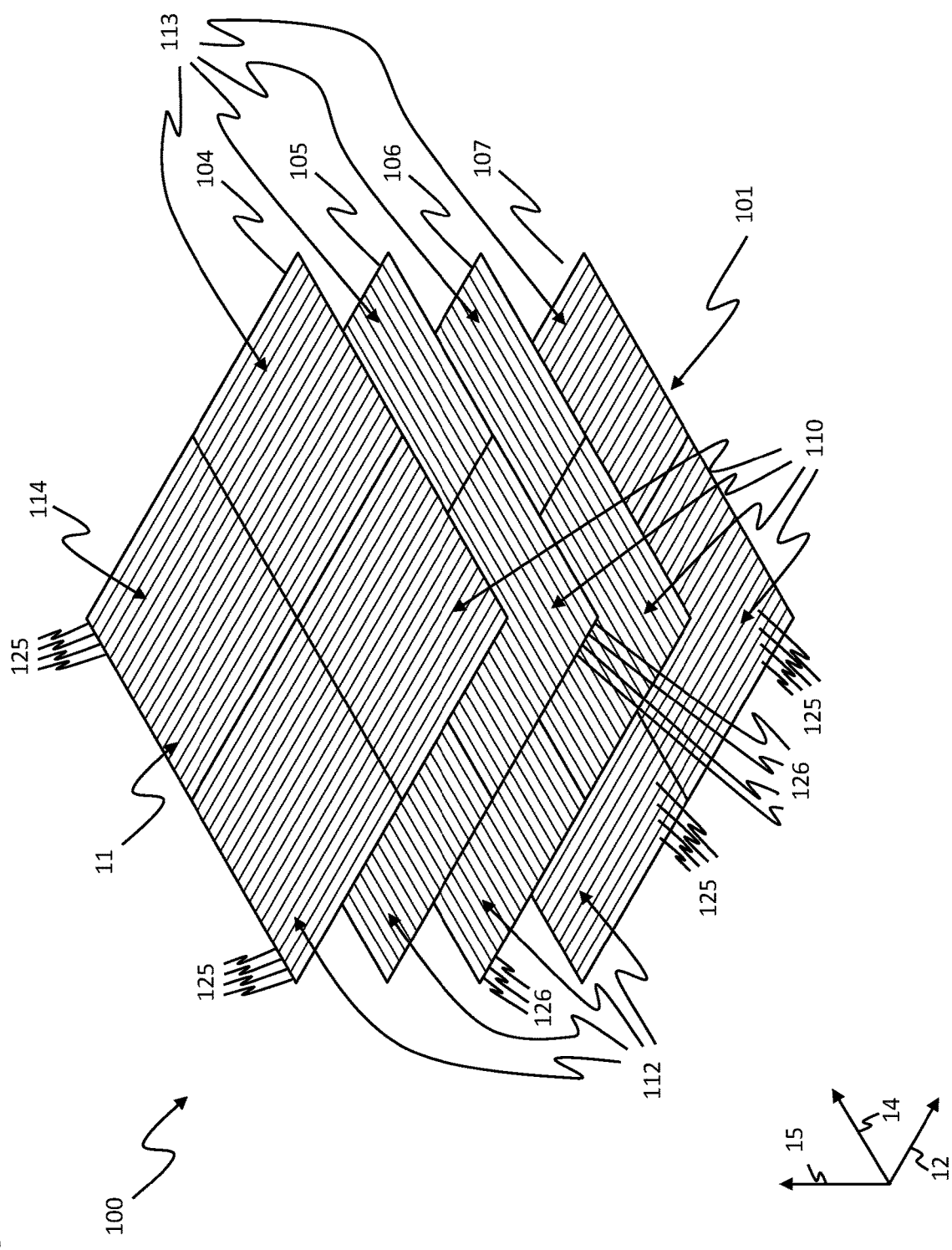
FIG. 4 shows an exploded view of a stator assembly of the stator module having first, second, third and fourth stator layers.

FIG. 4 shows a schematic perspective of an exploded view of the stator assembly 100 comprising the individual stator layers.

In the third direction 15, the stator assembly 100 comprises a second stator layer 105 under the first stator layer 104 arranged at the stator surface 11, a third stator layer 106 under the second stator layer 105 and a fourth stator layer 107 under the third stator layer 106. Unless differences are described in the following, the second, third and fourth stator layers 105, 106, 107 are formed as described for the first stator layer 104 at the stator surface 11 of the stator assembly 100 shown in FIG. 3.

In the fourth stator layer 107 as well as in the first stator layer 104, the stator sectors 110, 112, 113, 114 comprise first coil conductors 125 extend in an elongated manner along the first direction 12 and arranged side by side and adjoining one another in the direction perpendicular to the first direction 12. In the second stator layer 105 and in the third stator layer 106, the stator sectors 110, 112, 113, 114 comprise second coil conductors 126. Unless differences are described in the following, the second coil conductors 126 are formed as described for the first coil conductors 125 in the first stator layer 104 and in the fourth stator layer 107. In contrast to the first coil conductors 125 of the first and fourth stator layers 104, 107, the second coil conductors 126 of the second and third stator layers 105, 106 extend in an elongated manner along the second direction 14 and are arranged next to and adjoining one another in the direction perpendicular to the second direction 14.

In the first and fourth stator layers 104, 107, the stator sectors 110, 112, 113, 114 exclusively comprise the first coil conductors 125 extending in an elongated manner in the first direction 12 and not the second coil conductors 126 extending in an elongated manner in the second direction 14, as well. Likewise, in the second and third stator layers 105, 106, the stator sectors 110, 112, 113, 114 exclusively comprise the second coil conductors 126 extending in an elongated manner in the second direction 14 and not the first coil conductors 125 extending longitudinally in the first direction 12, as well.

The stator sectors 110, 112, 113, 114 each have the same dimensions in all stator layers 104, 105, 106, 107. In particular, the stator sectors 110, 112, 113, 114 have the same dimensions in all stator layers 104, 105, 106, 107 in the first direction 12 and in the second direction 14.

The number and arrangement of the first coil conductors 125 in the individual stator layers 104, 107 arranged on top of one another and comprising the first coil conductors 125, particularly in the first and fourth stator layers 104, 107 is identical. In particular, the first coil conductors 125 are arranged on top of one another in the third direction 15. In addition, the number and arrangement of the second coil conductors 126 in the individual stator layers 105, 106 arranged on top of one another and comprising the second coil conductors 126, particularly in the second and third stator layers 105, 106, is identical. In particular, the second coil conductors 126 are arranged on top of one another in the third direction 15.

The stator sectors 110, 112, 113, 114 are embodied to be energized independently from one another. In particular, the first coil conductors 125 and the second coil conductors 126 of the individual stator sectors 110, 112, 113, 114 on the stator assembly 100 are electrically insulated from one another. This means in particular that the coil conductors 125, 126 of the first stator sector 110 are embodied in an electrically insulated manner from the coil conductors 125, 126 of the second stator sector 112, from the coil conductors 125, 126 of the third stator sector 113 and from the coil conductors 125, 126 of the fourth stator sector 114. In addition, the coil conductors 125, 126 of the second stator sector 112 are electrically insulated from the coil conductors 125, 126 of the first stator sector 110, from the coil conductors 125, 126 of the third stator sector 113 and from the coil conductors 125, 126 of the fourth stator sector 114. Furthermore, the coil conductors 125, 126 of the third stator sector 113 are embodied in an electrically insulated manner from the coil conductors 125, 126 of the first stator sector 110, from the coil conductors 125, 126 of the second stator sector 112 and from the coil conductors 125, 126 of the fourth stator sector 114. Finally, the coil conductors 125, 126 of the fourth stator sector 114 are embodied in an electrically insulated manner from the coil conductors 125, 126 of the first stator sector 110, from the coil conductors 125, 126 of the second stator sector 112 and from the coil conductors 125, 126 of the third stator sector 113.

Whereas the coil conductors 125, 126 of the individual stator sectors 110, 112, 113, 114 on the stator assembly 100 are each formed in an electrically insulated manner from the coil conductors 125, 126 of the remaining stator sectors 110, 112, 113, 114, the coil conductors 125, 126 within the individual stator sectors 110, 112, 113, 114 may each be electrically conductively interconnected. In particular, within the stator sectors 110, 112, 113, 114, all first coil conductors 125 arranged on top of one another in the third direction 15, in particular all first coil conductors 125 of the first stator layer 104 and of the fourth stator layer 107 arranged on top of one another in the third direction 15, may respectively be electrically conductively connected to one another. All first coil conductors 125 arranged on top of one another in the third direction 15 may be electrically connected to one another in such a way that the same coil current flows in each of the first coil conductors 125 arranged on top of one another. For example, all first coil conductors 125 of the stator sectors 110, 112, 113, 114 arranged on top of one another in the third direction 15 may be connected in series.

Likewise, within the stator sectors 110, 112, 113, 114, all second coil conductors 126 arranged on top of one another in the third direction 15, in particular all second coil conductors 126 of the second stator layer 105 and of the third stator layer 106 arranged on top of one another in the third direction 15, may respectively be electrically conductively connected to one another. All second coil conductors 126 arranged on top of one another in the third direction 15 may in each case be electrically conductively connected to one another in such a way that the same coil current flows in each of the second coil conductors 126 arranged on top of one another. For example, within the individual stator sectors 110, 112, 113, 114 all second coil conductors 126 arranged on top of one another may be connected in series.

The coil conductors 125, 126 of the stator sectors 110, 112, 113, 114 are each combined to result in stator segments within the stator layers 104, 105, 106, 107.

Figure 5:
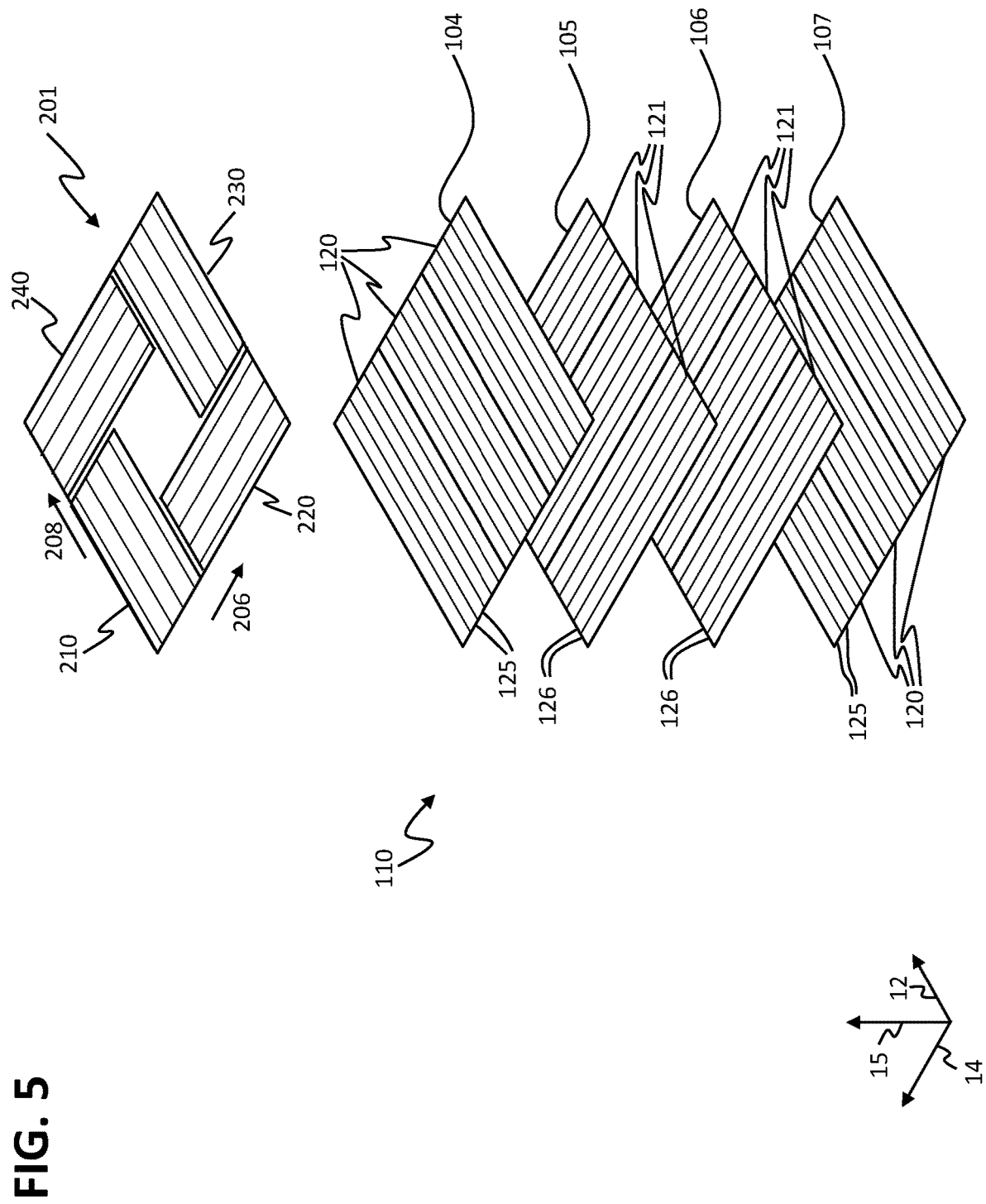
FIG. 5 shows the stator layers of a first stator sector of the stator assembly having individual stator segments.

FIG. 5 shows a schematic view of the stator layers 104, 105, 106, 107 of the first stator sector 110 with the individual stator segments.

The coil conductors 125, 126 of the first stator sector 110 are combined within the stator layers 104, 105, 106, 107 to form stator segments 120, 121. In each stator layer 104, 105, 106, 107, the first stator sector 110 comprises in each case three stator segments 120, 121 arranged next to and adjoining one another. Each of the stator segments 120, 121 comprises in each case six coil conductors 125, 126 arranged next to one another. In the first and fourth stator layers 104, 107, the first stator sector 110 respectively comprises three first stator segments 120 and three second stator segments 121 in the second and third stator layers 105, 106. The first stator segments 120 each comprise six adjacent first coil conductors 125 arranged side by side along the second direction 14 and extending in an elongated manner along the first direction 12. The second stator segments 121 each comprise six adjacent second coil conductors 126 arranged side by side along the first direction 12 and extending in an elongated manner along the second direction 14.

In the case of alternative embodiments of the stator assembly 100, the first stator segments 120 and/or the second stator segments 121 may also comprise a different number of coil conductors 125, 126 arranged next to one another. In particular, the first stator segments 120 and/or the second stator segments 121 may comprise eight coil conductors 125, 126 arranged side by side. In alternative embodiments of the stator assembly 100, the first stator sector 110 may also comprise a different number of stator segments 120, 121 arranged next to each other and adjoining each other.

Thus, in the first stator layer 104 and in the fourth stator layer 107, the first stator sector 110 of the stator assembly 100 exclusively comprises first coil conductors 125 which extend in an elongated manner along the first direction 12, and in the second stator layer 105 and in the third stator layer 106 exclusively second coil conductors 126 which extend in an elongated manner along the second direction 14.

Besides their orientation, the first and second stator segments 120, 121 have identical dimensions. In particular, in the first direction 12 the dimensions of the first stator segments 120 correspond to the dimensions of the second stator segments 121 in the second direction 14 and in the second direction 14, the dimensions of the first stator segments 120 correspond to the dimensions of the second stator segments 121 in the first direction 12.

The stator segments 120, 121 are arranged on top of one another in such a way that in each case each of the first stator segments 120 of the first and fourth stator layers 104, 107 of the first stator sector 110 extends in the first direction 12 over the three second stator segments 121 of the second and third stator layers 105, 106 of the first stator sector 110 arranged next to one another in the first direction 12. In addition, the second stator segments 121 of the second and third stator layers 105, 106 of the first stator sector 110 extend in the second direction 14 over all first stator segments 120 of the first and fourth stator layers 104, 107 of the first stator sector 110 arranged side by side in the second direction 14.

The arrangement of the coil conductors 125, 126 in the stator layers 104, 105, 106, 107 of the second stator sector 112, the third stator sector 113 and the fourth stator sector 114 corresponds to the arrangement of the coil conductors 125, 126 in the stator layers 104, 105, 106, 107 of the first stator sector 110 as shown in FIG. 5.

During operation of the planar-drive system 1, the rotor 200 may be aligned above the stator assembly 100 in such a way that the first rotor direction 206 is oriented along the first direction 12 and the second rotor direction 208 is oriented along the second direction 14. The first magnet unit 210 and the third magnet unit 230 may in operation interact with the magnetic field generated by the first coil conductors 125 of the first stator segments 120 to drive the rotor 200 along the second direction 14. The second magnet unit 220 and the fourth magnet unit 240 may in operation interact with the magnetic field generated by the second coil conductors 126 of the second stator segments 121 to drive the rotor 200 along the first direction 12.

Alternatively, other than shown in FIG. 5, the rotor 200 may be aligned in such a way that the first rotor direction 206 is oriented along the second direction 14 and the second rotor direction 208 is oriented along the first direction 12. In this case, the first and third magnet units 210, 230 interact with the magnetic field of the second stator segments 121 to drive the rotor 200 in the first direction 12 and the second and fourth magnet units 220, 240 interact with the magnetic field of the first stator segments 120 to drive the rotor 200 in the second direction 14.

In the stator assembly 100, the first coil conductors 125 are thus embodied to interact with the first drive magnets 211 of the rotor 200 to drive the rotor 200 in the direction perpendicular to the first direction 12. The second coil conductors 126 are embodied to interact with the second drive magnets 221 of the rotor 200 to drive the rotor 200 in the direction perpendicular to the second direction 14.

The first coil conductors 125 are spatially offset in the direction perpendicular to the first direction 12 by one third of an effective first wavelength of the first drive magnets 211 of the first and third magnet units 210, 230 interacting with the first coil conductors 125. The second coil conductors 126 are spatially offset in the direction perpendicular to the second direction 14 by one third of an effective second wavelength of the second drive magnets 221 of the second and fourth magnet units 220, 240 interacting with the second coil conductors 126.

The coil conductors 125, 126 of the individual stator segments 120, 121 may each be energized with the drive currents independently from the coil conductors 125, 126 of the other stator segments 120, 121. In particular, the drive currents in one of the stator segments 120, 121 do not necessarily depend on drive currents in another of the stator segments 120, 121. In addition, the coil conductors 125, 126 of one of the stator segments 120, 121 may be supplied with drive currents, while the coil conductors 125, 126 of another, for example an adjacent, stator segment 120, 121 are without current. The coil conductors 125, 126 of the individual stator segments 120, 121 are embodied on the stator assembly 100 to be electrically insulated from the coil conductors 125, 126 of the other stator segments 120, 121. The coil conductors 125, 126 of different stator segments 120, 121 may, for example, be supplied with the drive currents from separate power modules or from separate power-generating units or, respectively, output stages of a power module of stator module 10.

The coil conductors 125, 126 in the individual stator sectors 110, 112, 113, 114 may each be interconnected to form multi-phase systems with a shared neutral point. The neutral point may be formed on the stator assembly 100. In particular, the coil conductors 125, 126 may be interconnected to form three-phase systems with a shared neutral point. The three-phase systems may each comprise six adjacent first coil conductors 125 or six adjacent second coil conductors 126. The number of adjacent coil conductors 125, 126 in one of the three-phase systems may also be three, twelve or other multiples of three.

The multi-phase systems may be contacted on the stator assembly 100 in such a way that each of the multi-phase systems may be energized with a drive current independently of the other multi-phase systems. Alternatively, two or a plurality of the multi-phase systems may be connected to each other on the stator assembly 100 in such a way that the connected multi-phase systems are each supplied with a joint drive current. For example, the connected multi-phase systems on the stator assembly 100 may be connected in series or in in parallel.

If the coil conductors 125, 126 are connected to form multi-phase systems, fewer contacts are required to supply current to the coil conductors 125, 126 than if the individual coil conductors 125, 126 are supplied with current separately. This reduces the hardware involved for supplying current to the first coil conductor 125, 126, in particular the number of power-generating units required for the current supply.

The stator sectors 110, 112, 113, 114 may, as shown in FIGS. 4 and 5, each comprise eighteen coil conductors 125, 126 in each stator layer 104, 105, 106, 107. Six adjacent coil conductors 125, 126 may each be connected to form a three-phase system and the stator sectors 110, 112, 113, 114 may each comprise three three-phase systems adjacent to each other in the first direction 12 and three three-phase systems adjacent to each other in the second direction 14. In this context, coil conductors 125, 126, which are extended substantially in the same direction 12, 14 and are arranged on top of one another in the stator sectors 104, 105, 106, 107, may be connected in series to form a joint three-phase system. The coil conductors 125, 126 may be connected in such a way that in the third direction 15 coil conductors 125, 126 arranged on top of one another are each supplied with the same drive current. The three-phase systems thus have three phases that are interconnected from coil conductors 125, 126 arranged on top of one another in stator layers 104, 105, 106, 107.

For example, in the individual stator layers 104, 105, 106, 107, all coil conductors 125, 126 arranged on top of one another and aligned in in parallel may be connected in series. In particular, the first coil conductors 125 of three-phase systems arranged on top of one another, in particular of three-phase systems arranged on top of one another in the first stator layer 104 and in the fourth stator layer 107, and the second coil conductors 126 of three-phase systems arranged on top of one another, in particular of three-phase systems arranged on top of one another in the second stator layer 105 and in the third stator layer 106, may each be connected in series to form a joint three-phase system. All coil conductors 125, 126 lying on top of one another in the third direction 15 and oriented in in parallel may be connected in series.

In particular, in the stator assembly 100 within the individual first stator segments 120, the first coil conductors 125, which extend in an elongated manner along the first direction 12, are each connected to multi-phase systems with a shared neutral point. The individual multi-phase systems of different first stator segments 120 may be supplied with current independently from each other. Likewise, all second coil conductors 126 of the individual second stator segments 121 are each connected to further multi-phase systems. The other individual multi-phase systems of the second stator segments 121 may be energized independently from one another and independently from the multi-phase systems of the first stator segments 120. In particular, the first coil conductor 125 of the first stator segment 120 and the second coil conductor 126 of the second stator segment 121 are each interconnected to form three-phase systems. The first coil conductors 125 and the second coil conductors 126 of a stator segment 120, 121 may each be supplied with a three-phase drive current. The drive currents each comprise a first phase U, a second phase V and a third phase W, each of which has a phase offset of 120°.

Figure 6:
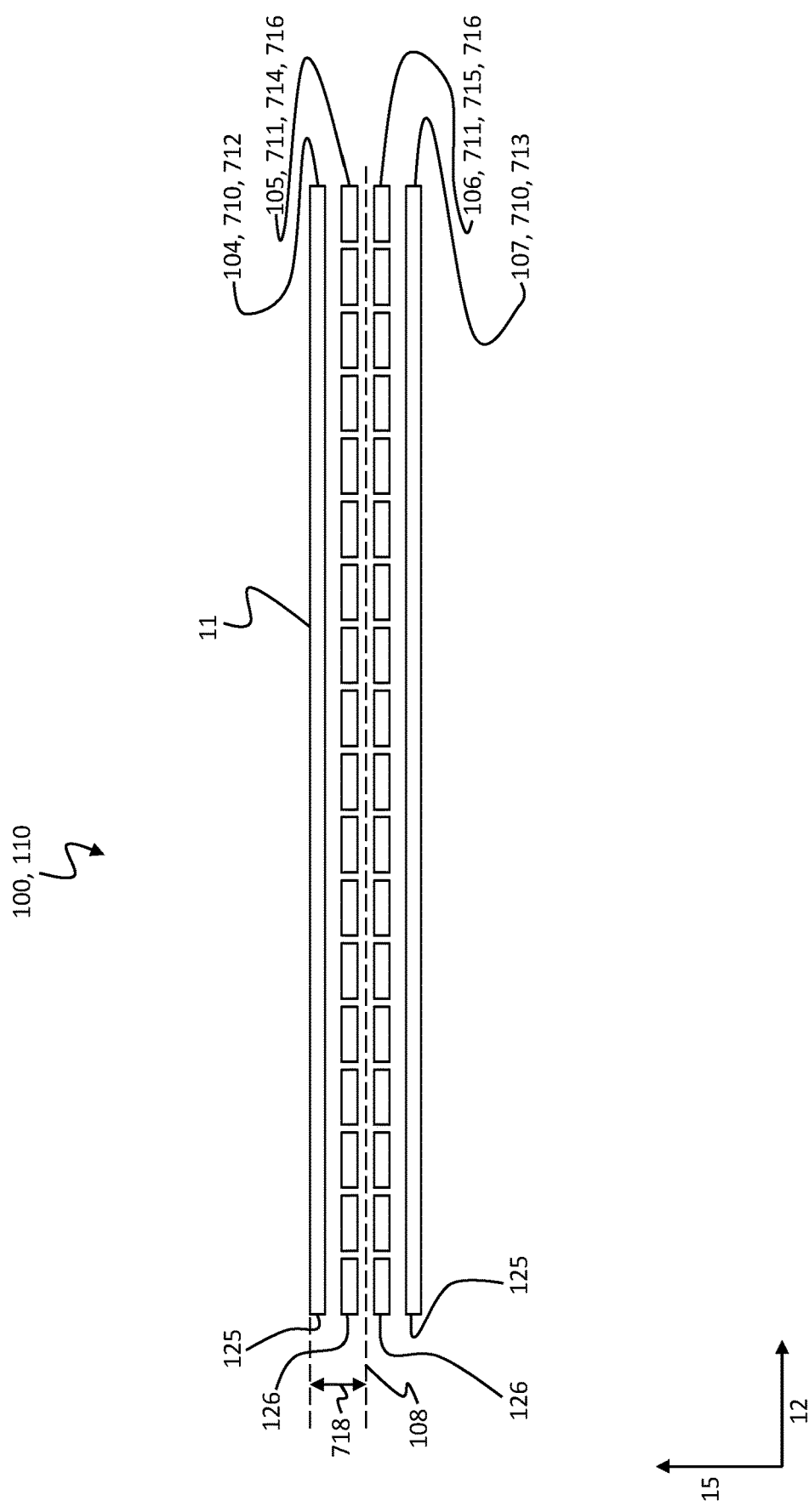
FIG. 6 shows the stator assembly in a sectional view.

FIG. 6 shows a schematic, not-to-scale depiction of the stator assembly 100 of stator module 10 in a sectional view. Thereby, the sectional plane is oriented perpendicular to the second direction 14. In FIG. 6 only the coil conductors 125, 126 and stator layers 104, 105, 106, 107 of the first stator sector 110 are shown. The coil conductors 125, 126 and stator layers 104, 105, 106, 107 of the second, third and fourth stator sectors 112, 113, 114 are embodied as described for the coil conductors 125, 126 and stator layers 104, 105, 106, 107 of the first stator sector 110.

The stator assembly 100 comprises a first arrangement of longitudinal stator layers 710 and a second arrangement of inclined stator layers 711. The longitudinal stator layers 710 are formed by all stator layers 104, 107 of the stator assembly 100, which comprise the first coil conductors 125 extended along the first direction 12. The inclined stator layers 711 are formed by all stator layers 105, 106 of the stator assembly 100, which comprise the second coil conductors 126 extending along the second direction 14. The first and the second direction 12, 14 are different from each other, and may, in particular, be oriented perpendicular to each other, as in the stator assembly 100. The first and the second directions 12, 14 may also have an angle other than 90°, for example an angle of 45° to each other. In particular, the first coil conductors 125 of the longitudinal stator layers 710, which extend in an elongated manner in the first direction 12, and the second coil conductors 126 of the inclined stator layers 711, which extend in an elongated manner in the second direction 14, do not have to be oriented perpendicular to each other. In the first stator assembly 100, the longitudinal stator layers 710 are formed by the first stator layer 104 and by the fourth stator layer 107 and the inclined stator layers 711 are formed by the second stator layer 105 and the third stator layer 106. The inclined stator layers 711 may also be generally referred to as transverse stator layers.

In the stator assembly 100, a first total number of longitudinal stator layers 710 corresponds to a second total number of inclined stator layers 711. In particular, in the stator assembly 100 the first total number is two and the second total number is two, as well. The longitudinal stator layers 710 and the inclined stator layers 711 are arranged on top of each other in the third direction 15. Furthermore, the longitudinal stator layers 710 and the inclined stator layers 711 are oriented in in parallel to each other and perpendicular to the third direction 15.

The first arrangement of the longitudinal stator layers 710 and the second arrangement of the inclined stator layers 711 have a shared center plane 108. The shared center plane 108 is oriented perpendicularly to the third direction 15. In the third direction 15, the center plane 108 is arranged centrally between the uppermost stator layer of the first arrangement of longitudinal stator layers 710 in the third direction 15 and the lowermost stator layer of the first arrangement of longitudinal stator layers 710 in the third direction 15. In particular, the central plane 108 is arranged centrally between the first stator layer 104 and the fourth stator layer 107. In addition, the center plane 108 is in the third direction 15 arranged centrally between the uppermost stator layer of the second arrangement of inclined stator layers 711 and the lowermost stator layer of the second arrangement of inclined stator layers 711. In particular, the center plane 108 is arranged centrally between the second stator layer 105 and the third stator layer 106.

The first arrangement of longitudinal stator layers 710 and the second arrangement of inclined stator layers 711 have an equal mean distance 718 from the stator surface 11 of the stator assembly 100. The stator surface 11 is arranged on the upper side of the first stator layer 104. The mean distance 718 of the longitudinal stator layers 710 is the mean value of the distances of the individual longitudinal stator layers 710, i.e. of the first and fourth stator layers 104, 107, from the stator surface 11. The mean distance 718 of the inclined stator layers 711 refers to the mean value of the distances of the individual inclined stator layers 711, i.e. the second and third stator layers 105, 106, from the stator surface 11. In the stator assembly 100, the mean distance 718 of the longitudinal stator layers 710 corresponds to half the distance between the surfaces of the first and fourth stator layers 104, 107. The mean distance of the inclined stator layers 711 corresponds to half the distance between the surfaces of the second and third stator layers 105, 106.

The first arrangement of longitudinal stator layers 710 is symmetrical to the shared center plane 108 in the third direction 15. This means that the longitudinal stator layers 710 are positioned or arranged symmetrically to the center plane 108 in the third direction 15. In particular, the longitudinal stator layers 710 arranged above the center plane 108 in the third direction 15 and the longitudinal stator layers 710 arranged below the center plane 108 in the third direction 15 are arranged in pairs opposite to one another in the third direction 15.

The second arrangement of inclined stator layers 711 is embodied symmetrically to the shared center plane 108 in the third direction 15. This means that the inclined stator layers 711 are positioned or arranged symmetrically to the center plane 108 in the third direction 15. In particular, the inclined stator layers 711 arranged above the center plane 108 in the third direction 15 and the inclined stator layers 711 arranged below the center plane 108 in the third direction 15 are arranged in pairs opposite to each other in the third direction 15. In the stator assembly 100, a distance of the shared center plane 108 from the stator surface 11 corresponds to the mean distance 718 of the longitudinal stator layers 710 and of the inclined stator layers 711 from the stator surface 11.

Whereas the first arrangement of longitudinal stator layers 710 and the second arrangement of inclined stator layers 711 is symmetrical to the center plane 108, the longitudinal stator layers 710 or the inclined stator layers 711 themselves do not have to be symmetrical with regard to the center plane 108. In particular, longitudinal stator layers 710 or inclined stator layers 711 opposite to one another in the third direction 15 with respect to the center plane 108 may be embodied differently from one another. In particular, the opposite longitudinal stator layers 710 or the opposite inclined stator layers 711 may each have different arrangements of coil conductors 125, 126, horizontal connecting structures and/or vertical connecting structures.

The stator assembly 100 comprises an uppermost stator layer 712 and a lowermost stator layer 713. The uppermost stator layer 712 is located above all other stator layers 710, 711 in the third direction 15 and the lowermost stator layer 713 is located below all other stator layers 710, 711 in the third direction 15. All remaining stator layers 710, 711 of the stator assembly 100 are in the third direction 15 arranged between the uppermost stator layer 712 and the lowermost stator layer 713, so that the uppermost stator layer 712 and the lowermost stator layer 713 form the outer layers of the stator assembly 100. The uppermost stator layer 712 and the lowermost stator layer 713 are each embodied as longitudinal stator layers 710 having first coil conductors 125. In the stator assembly 100, the uppermost stator layer 712 is formed by the first stator layer 104 and the lowermost stator layer 713 is formed by the fourth stator layer 107. All stator layers that are arranged between the uppermost stator layer 712 and the lowermost stator layer 713 of the stator assembly 100, in particular the second and third stator layers 105, 106, form inner layers 716 of the stator assembly 100.

The stator assembly 100 also comprises a second uppermost stator layer 714 and a second lowermost stator layer 715. The second uppermost stator layer 714 is arranged next to the uppermost stator layer 712 and is arranged below the uppermost stator layer 712 in the third direction 15. The second lowermost stator layer 715 is arranged next to the lowermost stator layer 713 and is arranged above the lowermost stator layer 713 in the third direction 15. The second uppermost stator layer 714 and the second lowermost stator layer 715 are each embodied as inclined stator layers 711 with the second coil conductors 126. In the stator assembly 100, the second uppermost stator layer 714 is formed by the second stator layer 105 and the second lowermost stator layer 715 by the third stator layer 106.

In the stator assembly 100, the longitudinal stator layers 710 are in the third direction 15 arranged at most on a side next to an inclined stator layer 711. In particular, the first stator layer 104 formed as longitudinal stator layer 710 is arranged next to an inclined stator layer 711, i.e. next to the second stator layer 105 formed as inclined stator layer 711, only on its bottom side. In addition, the fourth stator layer 107 formed as longitudinal stator layer 710 is arranged next to an inclined stator layer 711, i.e. next to the third stator layer 106 formed as inclined stator layer 711, only on its upper side.

In the stator assembly 100, moreover, the inclined stator layers 711 in the third direction 15 are at most arranged on one side next to a longitudinal stator layer 710. In particular, the second stator layer 105, which is embodied as an inclined stator layer 711, is arranged next to a longitudinal stator layer 710 only on its upper side, i.e. next to the first stator layer 104. On its bottom side, the second stator layer 105 is arranged next to an inclined stator layer 711, i.e. next to the third stator layer 106. In addition, the third stator layer 106 embodied as an inclined stator layer 711 is arranged next to a longitudinal stator layer 710 only on its bottom side, i.e. next to the fourth stator layer 107. On its upper side, the third stator layer 106 is arranged next to an inclined stator layer 711, i.e. next to the second stator layer 105.

Thus, in the stator assembly 100 in the third direction 15, exactly one inclined stator layer 711 is arranged next to each longitudinal stator layer 710 and exactly one longitudinal stator layer 710 is arranged next to each inclined position 711.

The inner layers 716 of the stator assembly 100 are formed by the second stator layer 105 and the third stator layer 106. The inner layers 716 are arranged between the uppermost stator layer 712 and the lowermost stator layer 713. The inner layers 716 of the stator assembly 100 are embodied as two inclined stator layers 711 arranged side by side in the third direction 15. The inner layers 716 embodied as inclined stator layers 711 are arranged between two longitudinal stator layers 710. In the stator assembly 100, in particular in the third direction 15, both an inclined stator layer 711 and a longitudinal stator layer 710 are arranged next to each inner layer 716 embodied as an inclined stator layer 711.

In the stator assembly 100, each stator layer 105, 106 having second coil conductors 126, i.e. the second stator layer 105 and the third stator layer 106, is arranged next to a stator layer 104, 107 having first coil conductors 125 only on one side in the third direction 15. On the other side, the stator layers 105, 106 having second coil conductors 126 are arranged next to a stator layer 105, 106 having second coil conductors 126. In addition, in the stator assembly 100, each stator layer 104, 107 having first coil conductors 125, i.e. the first stator layer 104 and the fourth stator layer 107, is located only on one side next to a stator layer 105, 106 having second coil conductors 126 in the third direction 15.

The stator assembly 100 may be embodied as a multi-layer unit, wherein the stator layers 104, 105, 106, 107 with the first and second coil conductors 125, 126 are each mechanically connected to one another via insulating intermediate layers. The stator assembly 100 may be embodied as a printed circuit or printed circuit board. In particular, the stator assembly 100 may be embodied as a multi-layer printed circuit board, wherein the stator layers 104, 105, 106, 107 are each arranged in different conductor-path layers of the printed circuit board.

The stator assembly 100 only comprises two stator-layer changes in which the orientation of the coil conductors 125, 126 changes in the third direction 15 and in which first coil conductors 125 extending in the first direction 12 are arranged next to second coil conductors 126 extending in the second direction 14. In particular, the stator assembly 100 has a first stator-layer change between the uppermost stator layer 712 and the second uppermost stator layer 714, in which the orientation of the coil conductors 125, 126 changes in the third direction 15, and a second stator-layer change between the second lowermost stator layer 715 and the lowermost stator layer 713, in which the orientation of the coil conductors 125, 126 changes in the third direction 15. Thus, the orientation of the coil conductors 125, 126 of the stator assembly 100 changes only twice in the third direction 15. As a result, the capacitance of the stator-layer arrangement of the stator assembly 100 is particularly low. In particular, the capacitance is lower than in a stator-layer arrangement in which longitudinal stator layers 710 and inclined stator layers 711 are arranged in an alternating manner in the third direction 15.

Figure 7:
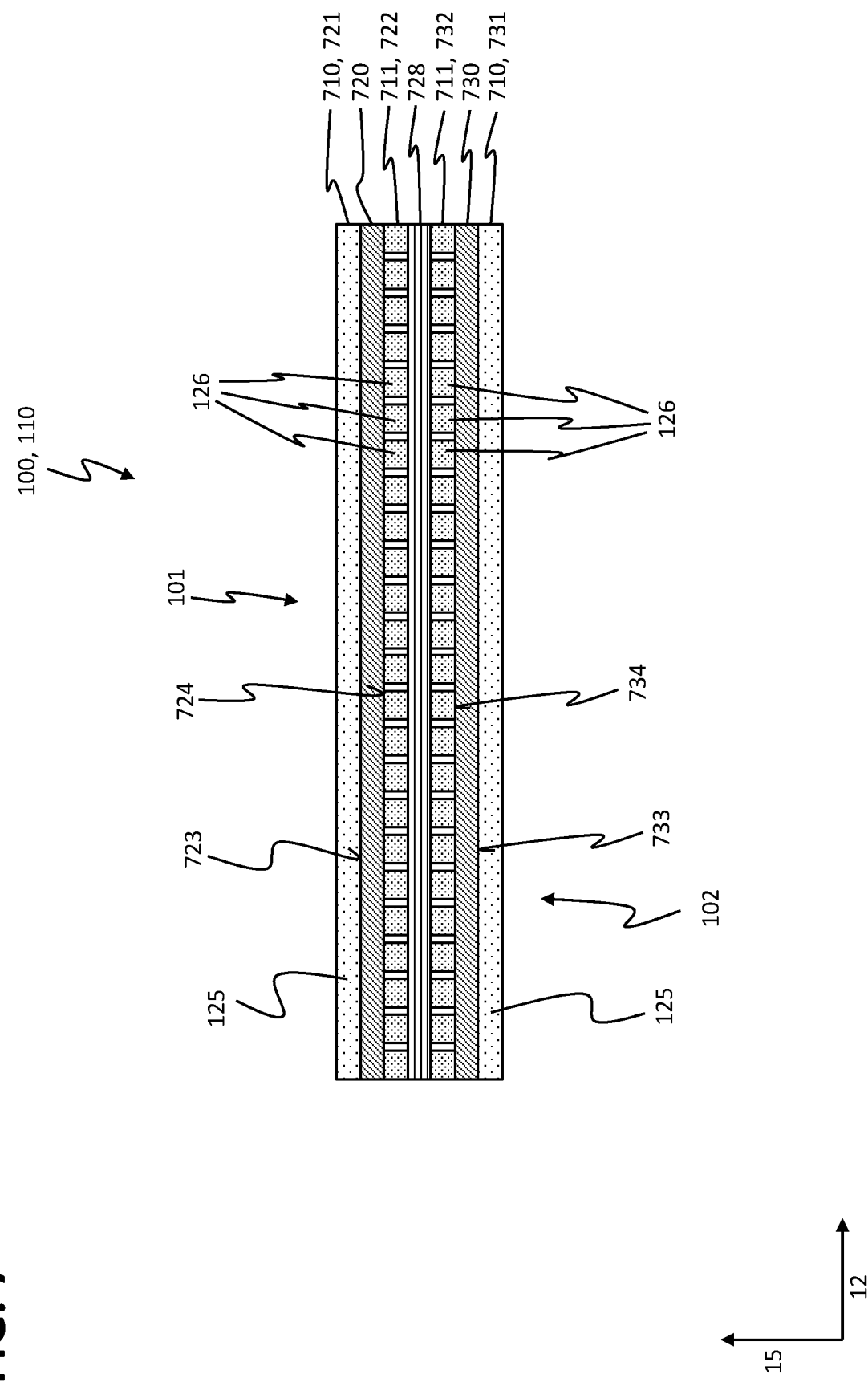
FIG. 7 shows a first carrier plate and a second carrier plate of the stator assembly in a sectional view.

FIG. 7 shows another schematic, not-to-scale depiction of the stator assembly 100 in a sectional view, wherein the sectional plane is oriented perpendicularly to the second direction 14. The stator assembly 100 has a first carrier plate 720 and a second carrier plate 730. Unless differences are described, the second carrier plate 730 is embodied as described for the first carrier plate 720.

The first carrier plate 720 is plate-shaped in the first direction 12 and in the second direction 14, in particular as a plate extending in the first and second direction 12, 14. The first carrier plate 720 extends in the first direction 12 and in the second direction 14 and has a smaller extension in the third direction 15 than in the first direction 12 and in the second direction 14. The first carrier plate 720 extends in the first direction 12 between the side faces 32 of the stator assembly 100 oriented along the second direction 14. In the second direction 14, the first carrier plate 720 extends between the side faces 32 of the stator assembly 100 oriented along the first direction 12.

The first carrier plate 720 is formed in two layers, i.e. it comprises two stator layers of the stator assembly 100. The first carrier plate 720 has a first side 723 and a second side 724 opposite to the first side 723 in the third direction 15. On the first side 723 of the first carrier plate 720, a longitudinal stator layer 710 of the stator assembly 100 with first coil conductors 125 referred to as first longitudinal stator layer 721 is arranged. On the second side 724 of the first carrier plate 720, an inclined stator layer 711 of the stator assembly 100 having second coil conductors 126 referred to as first inclined stator layer 722 is arranged. The first side 723 of the first carrier plate 720 and the second side 724 of the first carrier plate 720 are each plane and arranged in in parallel to each other.

The first carrier plate 720 comprises an electrically insulating material, for example a ceramic, a plastic or a glass fibre reinforced plastic. The electrically insulating material is arranged between the first longitudinal stator layer 721 and the first inclined stator layer 722 in the third direction 15. The first longitudinal stator layer 721 having the first coil conductors 125 and the first inclined stator layer 722 with the second coil conductors 126 are in the third direction 15 embodied as flat and electrically conductive layers, for example metallic layers.

The first carrier plate 720 may be embodied as a printed circuit board, in particular as a printed circuit board, and the first longitudinal stator layer 721 and the first inclined stator layer 722 may be embodied as conductor-path layers of the printed circuit board. The first coil conductors 125 of the first longitudinal stator layer 721 and the second coil conductors 126 of the first inclined stator layer 722 may be formed on the sides 723, 724 or layers of the first carrier plate 720 as conductor strips extending in an elongated manner and having a thickness between 10 μm and 500 μm, in particular the conductor strips may have a thickness between 50 μm and 250 μm. The first coil conductors 125 of the first longitudinal stator layer 721 and the second coil conductors 126 of the second inclined stator layer 722 may also be formed as metal strips or metal wires.

The second carrier plate 730 is embodied as described for the first carrier plate 720. In particular, the second carrier plate 730 has a first side 733 and a second side 734 opposite to the first side 733 of the second carrier plate 730 in the third direction 15. On the first side 733 of the second carrier plate 730, a longitudinal stator layer 710 with first coil conductors 125 referred to as the second longitudinal stator layer 731 is arranged, and on the second side 734 of the second carrier plate 733, an inclined stator layer 711 having second coil conductors 126 referred to as second inclined stator layer 732 is arranged. In analogy to the first carrier plate 720, the second carrier plate 730 may be embodied as a circuit board, in particular as a printed circuit board, and the second longitudinal stator layer 731 and the first inclined stator layer 732 may be embodied as conductor-path layers of the printed circuit board.

The first carrier plate 720 is aligned in such a way that the first side 723 of the first carrier plate 720 is located above the second side 724 of the first carrier plate 720 in the third direction 15. Thus, the first side 723 of the first carrier plate 720 forms the upper side of the first carrier plate 720 in the third direction 15 and the second side 724 of the first carrier plate 720 forms the bottom side of the first carrier plate 720 in the third direction 15. The second carrier plate 730 is oriented in such a way that the first side 733 of the second carrier plate 730 is located below the second side 734 of the second carrier plate 730 in the third direction 15. Thus, the first side 733 of the second carrier plate 730 forms the bottom side of the second carrier plate 730 in the third direction 15 and the second side 734 of the second carrier plate 730 forms the upper side of the second carrier plate 730 in the third direction 15.

The first carrier plate 720 and the second carrier plate 730 of the stator assembly 100 are arranged next to each other in the third direction 15. The first carrier plate 720 and the second carrier plate 730 are aligned in in parallel to each other. The first carrier plate 720 is arranged above the second carrier plate 730 in the third direction 15. In particular, the second side 724 of the first carrier plate 720 is arranged facing the second side 734 of the second carrier plate 730. The first side 723 of the first carrier plate 720 forms an upper side 101 of the stator assembly 100 in the third direction 15 and the first side 733 of the second carrier plate 730 forms a bottom side 102 of the stator assembly 100 in the third direction 15.

In the stator assembly 100, the first longitudinal stator layer 721 forms the first stator layer 104 of the stator assembly 100. The first inclined stator layer 722 forms the second stator layer 105, the second inclined stator layer 732 forms the third stator layer 106, and the second longitudinal stator layer 731 forms the fourth stator layer 107 of the stator assembly 100.

An insulating layer 728 is arranged between the first carrier plate 720 and the second carrier plate 730. The insulating layer 728 is electrically insulating. The insulating layer 728 may, for example, have a plastic or a ceramic material. The insulating layer 728 may in the first direction 12 extend between the side surfaces 32 of the stator assembly 100 running along the second direction 14 and, in the second direction 14, between the side surfaces 32 of the stator assembly 100 running along the first direction 12. The insulating layer 728 and the carrier plates 720, 730 may have an equal thickness in the third direction 15. The thickness of the carrier plates 720, 730 and of the insulating layer 728 may be, for example, between 35 μm and 200 μm, in particular between 50 μm and 100 μm, in particular 75 μm, in the third direction 15. In the third direction 15, however, the thickness of the insulating layer 728 may also be less or greater than that of the carrier plates 720, 730.

The insulating layer 728 is mechanically fixed to the first carrier plate 720 and to the second carrier plate 730. For example, the insulating layer 728 may be glued to the carrier plates 720, 730. Alternatively or additionally, a connecting element may run through the stator assembly 100 in the third direction 15 and mechanically connect the carrier plates 720, 730 and the insulating layer 728 to one another. The connecting element may, for example, run from the upper side 101 of the stator assembly 100 to the bottom side 102 of the stator assembly 100. The connecting element may e.g. run from the first side 723 of the first carrier plate 720 to the first side 733 of the second carrier plate 730. The connecting element may, for example, be embodied as a press-fit connector. In addition to the connecting element, the stator assembly 100 may have other identically embodied connecting elements.

The stator assembly 100 in total comprises a multi-layer stator-layer arrangement having an even number of stator layers 104, 105, 106, 107. The stator assembly 100 in particular comprises a four-layer stator-layer arrangement. The stator assembly 100 comprises a plurality of two-layer carrier plates 720, 730 arranged on top of one another in the third direction 15. In particular, the stator assembly 100 comprises two two-layer carrier plates 720, 730 arranged on top of one another in the third direction 15.

In the stator assembly 100 in the third direction 15, an inclined stator layer 711 is arranged next to each longitudinal stator layer 710 and an inclined stator layer 710 is arranged next to each inclined stator layer 711. Each longitudinal stator layer 710 is thereby arranged on the first side 723, 733 and each adjacently arranged inclined stator layer 711 on the second side 724, 734 of the respective two-layer carrier plates 720, 730. In particular, the stator assembly 100 respectively comprises exclusively two-layer carrier plates 720, 730, on the first side 723, 733 of which a longitudinal stator layer 710 is arranged and on the second side 724, 734 of which an inclined stator layer 711 is arranged.

The stator assembly 100 may have connecting structures in the area of the stator segments 120, 121. The connecting structures may be arranged on the coil conductors 125, 126 or between the coil conductors 125, 126 of the stator segments 120, 121.

The connecting structures may be embodied as horizontal connecting structures or vertical connecting structures. The horizontal connecting structures are arranged in one of the stator layers 104, 105, 106, 107 and extend in the plane defined by the first and second direction 12, 14. The horizontal connecting structures may extend in an elongated manner. The horizontal connecting structures may be embodied, like the coil conductors 125, 126, as conductor paths or conductor-path sections of a layer of a circuit board of the stator assembly 100.

The horizontal connecting structures may be embodied as longitudinal connectors and run in in parallel to the coil conductors 125, 126 of the stator layer 104, 105, 106, 107 in which they are arranged. For example, horizontal connecting structures formed as longitudinal connectors and arranged in the longitudinal stator layers 710 having first coil conductors 125 extend in an elongated manner along the first direction 12. Horizontal connecting structures formed as longitudinal connectors and arranged in the inclined stator layers 711 having second coil conductors 126 extend in an elongated manner along the second direction 14. Horizontal connecting structures formed as longitudinal connectors may also be referred to as in parallel connectors.

The horizontal connecting structures may also be embodied as cross-connectors and extend perpendicularly to the coil conductors 125, 126 of the stator layers 104, 105, 106, 107 in which they are arranged. For example, horizontal connecting structures embodied as cross-connectors and arranged in the longitudinal stator layers 710 having first coil conductors 125 extend in an elongated manner along the direction perpendicular to the first direction 12, in the case of the stator assembly 100 along the second direction 14. Horizontal connecting structures formed as cross-connectors and arranged in the inclined stator layers 711 having second coil conductors 126 correspondingly extend in an elongated manner along the direction perpendicular to the second direction 14, in the case of the stator assembly 100 along the first direction 12.

The stator layers 104, 105, 106, 107 may thus comprise a plurality of conductor structures. The conductor structures comprise the first or second coil conductors 125, 126 arranged in the respective stator layer 104, 105, 106, 107, as well as the horizontal connecting structures arranged in the respective stator layer 104, 105, 106, 107, in particular the longitudinal connectors and/or cross-connectors arranged in the respective stator layer 104, 105, 106, 107.

A part of the connecting structures may be embodied as vertical connecting structures which connect conductor structures, in particular coil conductors 125, 126 or horizontal connecting structures, which are arranged on top of one another in the individual stator segments 120, 121 in different stator layers 104, 105, 106, 107. The vertical connecting structures may be embodied as through-holes or as vias (vertical interconnect access) between the individual stator layers 104, 105, 106, 107 of the carrier plates 710, 720 of the stator assembly 100.

Figure 8:
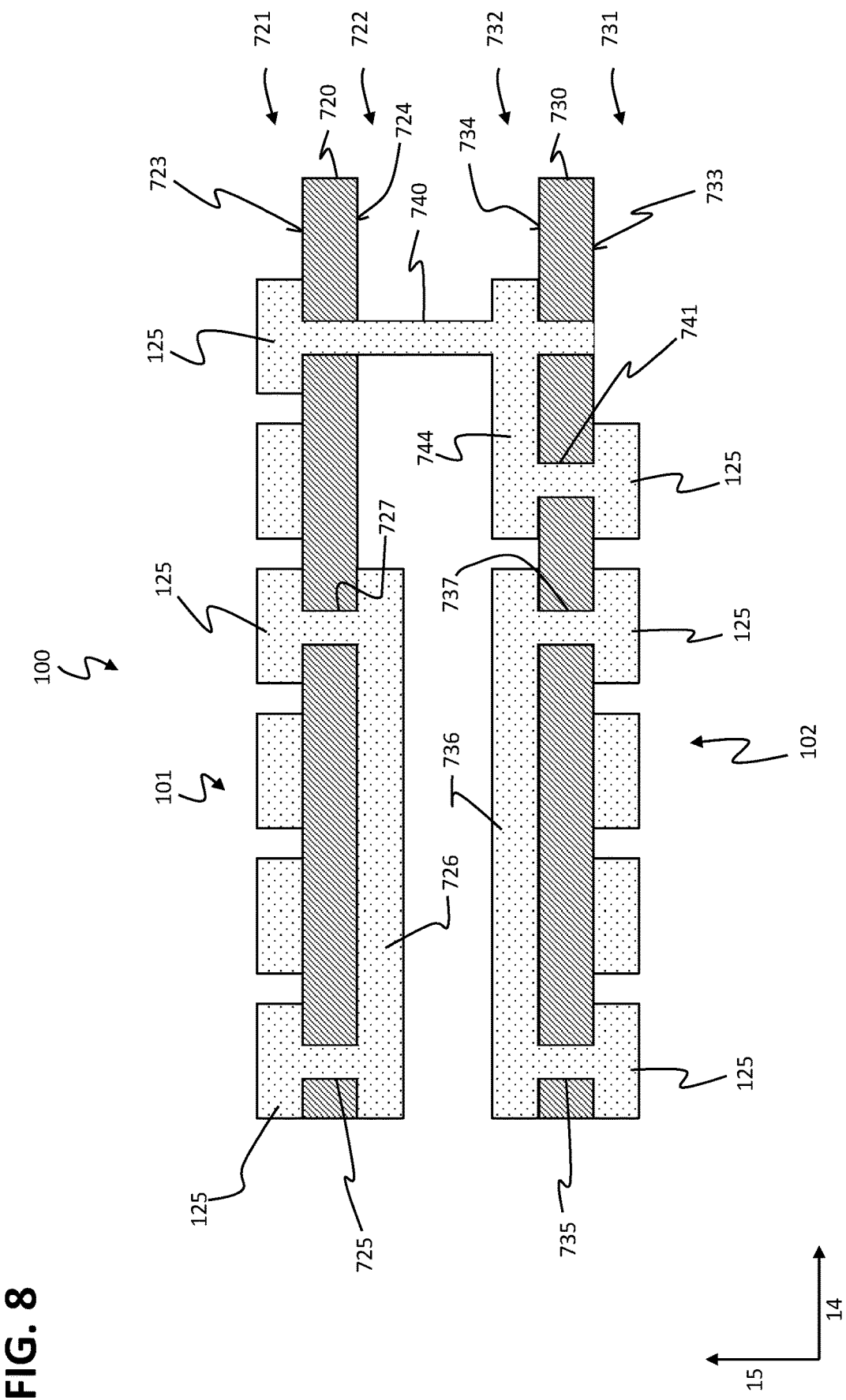
FIG. 8 shows the carrier plates of the stator assembly in a further sectional view with connecting structures.

FIG. 8 shows a schematic, not-to-scale depiction of a section of the stator assembly 100 in a further, enlarged sectional view. In the further sectional view shown in FIG. 8, the sectional plane is oriented perpendicularly to the first direction 12, unlike the sectional view shown in FIG. 7. In the schematic representation of FIG. 8, an insulating layer 728 is arranged between the first carrier plate 720 and the second carrier plate 730.

The first carrier plate 720 comprises a first vertical connecting structure 725. The first vertical connecting structure 725 is oriented in in parallel to the third direction 15 and runs through the first carrier plate 720 in the third direction 15. The first vertical connecting structure 725 extends from the first side 723 of the first carrier plate 720 to the second side 724 of the first carrier plate 720 in the third direction 15. In particular, in the third direction 15, the first vertical connecting structure 725 does not protrude over the first carrier plate 720. In particular, the first vertical connecting structure 725 may, in the third direction 15, end on the first side 723 of the first carrier plate 720 and on the second side 724 of the first carrier plate 720.

The first vertical connecting structure 725 connects a first coil conductor 125 of the first longitudinal stator layer 721 arranged on the first side 723 of the first carrier plate 720 to a first conductor structure 726 arranged on the second side 724 of the first carrier plate 720 in an electrically conductive manner. On the second side 724 of the first carrier plate 720, the first conductor structure 726 may run in in parallel to the second coil conductors 126 of the first inclined stator layer 722. The first conductor structure 726 may be a first horizontal connecting structure, in particular a first cross-connector or a first longitudinal connector. The first conductor structure 726 may be embodied in an electrically insulated manner with regard to the second coil conductors 126 of the second side 724 of the first carrier plate 720 so that there is no electrical connection between the first coil conductors 125 on the first side 723 of the first carrier plate 720 and the second coil conductors 126 on the second side 724 of the first carrier plate 720.

The first coil conductor 125 of the first longitudinal stator layer 721 may be electrically connected directly to the first vertical connecting structure 725. The first coil conductor 125 of the first longitudinal stator layer 721 may also be electrically conductively connected to the first vertical connecting structure 725 via a horizontal connecting structure arranged on the first longitudinal stator layer 721, in particular via a cross-connector arranged on the first longitudinal stator layer 721 or via a longitudinal connector arranged on the first longitudinal stator layer 721.

In addition to the first vertical connecting structure 725, the first carrier plate 720 may comprise further vertical connecting structures which are embodied in the same way as the first vertical connecting structure 725. For example, the first carrier plate 720 may, as shown in FIG. 8, comprise a further first vertical connecting structure 727 which electrically conductively connects the first conductor structure 726 arranged on the first inclined stator layer 722 with a further first coil conductor 125 of the first longitudinal stator layer 721. The further first coil conductor 125 and the further first vertical connecting structure 727 may be electrically conductively connected directly or via a horizontal connecting structure.

The second carrier plate 730 comprises a second vertical connecting structure 735. Unless differences are described, the second vertical connecting structure 735 is formed as described for the first vertical connecting structure 725. The second vertical connecting structure 735 is aligned in parallel to the third direction 15 and passes through the second carrier plate 730 in the third direction 15. In the third direction 15, the second vertical connecting structure 735 extends from the first side 733 of the second carrier plate 730 to the second side 734 of the second carrier plate 730. In particular, the second vertical connecting structure 735 does not protrude over the second carrier plate 730 in the third direction 15. In particular, in the third direction 15, the second vertical connecting structure 735 may end on the first side 733 of the second carrier plate 730 and on the second side 734 of the second carrier plate 730.

The second vertical connecting structure 735 connects a first coil conductor 125 of the second longitudinal stator layer 731 arranged on the first side 733 of the second carrier plate 730 with a second conductor structure 736 arranged on the second side 734 of the second carrier plate 730 in an electrically conductive manner. Unless differences are described, the second conductor structure 736 is embodied as described for the first conductor structure 726. On the second side 734 of the second carrier plate 730, the second conductor structure 736 may run in parallel to the second coil conductors 126 of the second inclined stator layer 732. The second conductor structure 736 may be a second horizontal connecting structure, in particular a second cross-connector or a second longitudinal connector. The second conductor structure 736 may be electrically insulated from the second coil conductors 126 of the second side 734 of the second carrier plate 730 so that no electrical connection exists between the first coil conductors 125 on the first side 733 of the second carrier plate 730 and the second coil conductors 126 on the second side 734 of the second carrier plate 730.

The first coil conductor 125 of the second longitudinal stator layer 731 may be electrically connected directly to the second vertical connecting structure 735. However, the first coil conductor 125 of the second longitudinal stator layer 731 may also be electrically conductively connected to the second vertical connecting structure 735 via a horizontal connecting structure arranged on the second longitudinal stator layer 731, in particular via a cross-connector arranged on the second longitudinal stator layer 731 or via a longitudinal connector arranged on the second longitudinal stator layer 731.

In addition to the second vertical connecting structure 735, the second carrier plate 730 may comprise further vertical connecting structures which are embodied as the second vertical connecting structure 735. For example, the second carrier plate 730 may comprise a further second vertical connecting structure 737, as shown in FIG. 8, which electrically conductively connects the second conductor structure 736 arranged on the second inclined stator layer 732 with a further first coil conductor 125 of the second longitudinal stator layer 731. The further first coil conductor 125 of the second longitudinal stator layer 731 and the further second vertical connecting structure 737 may be connected in an electrically conductive manner either directly or via a horizontal connecting structure arranged on the second longitudinal stator layer 731.

The first vertical connecting structure 725 and the second vertical connecting structure 735 are arranged 15 on top of one another in the third direction. In particular, the first vertical connecting structure 725 and the second vertical connecting structure 735 are aligned in the third direction 15. The first vertical connecting structure 725 and the second vertical connecting structure 735 are electrically insulated from each other by the insulating layer 728. In particular, the first vertical connecting structure 725 merely extends up to the insulating layer 728, in particular up to an upper side of the insulating layer 728 on the second side 724 of the first carrier plate 720. The second vertical connecting structure 735 also merely extends up to the insulating layer 728, in particular up to a bottom side of the insulating layer 728, on the second side 734 of the second carrier plate 730.

In analogy to the first and second vertical connecting structure 725, 735, further vertical connecting structures of the first and second carrier plate 720, 730 may be arranged on top of one another in the third direction 15, as well. In particular, the further first vertical connecting structure 727 and the further second vertical connecting structure 737 may be arranged on top of one another in the third direction 15 in the same way as the first and second vertical connecting structures 725, 735.

The stator assembly 100 comprises a third vertical connecting structure 740. Unless differences are described, the third vertical connecting structure 740 is embodied as described for the first vertical connecting structure 725. The third connecting structure 740 electrically connects a first coil conductor 125 located on the first side 723 of the first carrier plate 720 with a third conductor structure 744 located on the second side 734 of the second carrier plate 730. The third conductor structure 744 may e.g. be a third horizontal connecting structure, in particular a third longitudinal connector or a third cross-connector. The third conductor structure 740 may be electrically insulated from the second coil conductors 126 of the second side 734 of the second carrier plate 730 so that no electrical connection exists between the first coil conductors 125 on the first side 723 of the first carrier plate 720 and the second coil conductors 126 on the second side 734 of the second carrier plate 730.

The third vertical connecting structure 740 runs in parallel to the third direction 15. In the third direction 15, the third vertical connecting structure 740 runs through the first carrier plate 720 and the insulating layer 728. The third vertical connecting structure 740 may also run through the second carrier plate 730. In particular, the third vertical connecting structure 740 may extend from the upper side 101 of the stator assembly 100 to the bottom side 102 of the stator assembly 100 and from the uppermost stator layer 712 to the lowermost stator layer 713. In the stator assembly 100 shown in FIG. 8, the third vertical connecting structure 740 then extends from the first side 723 of the first carrier plate 720 to the first side 733 of the second carrier plate 730.

The third vertical connecting structure 740 only touches conductor structures of the relevant stator layer 104, 105, 106, 107 only on two stator layers 104, 105, 106, 107 of the stator assembly 100. On the remaining stator layers 104, 105, 106, 107, the conductor structures of the relevant stator layer 104, 105, 106, 107 are embodied at a distance from the third vertical connecting structure 740. In particular, on the remaining stator layers 104, 105, 106, 107 between the third vertical connecting structure 740 and the conductor structures of the relevant stator layer 104, 105, 106, 107, annular insulating regions may be arranged around the third vertical connecting structure 740. In particular, the third vertical connecting structure 740 only touches conductor structures of the first longitudinal stator layer 721 and conductor structures of the second inclined stator layer 732, so that the third vertical connecting structure 740 forms an electrically conductive connection between the conductor structures of the first inclined stator layer 722 and the conductor structures of the second longitudinal stator layer 731. In this case, the third vertical connecting structure 740 is electrically conductively connected to first coil conductors 125 only on the first longitudinal stator layer 721 and is formed on the second inclined stator layer 732 in an electrically insulated manner from the second coil conductors 126 arranged there, so that no electrically conductive connection exists between the first and the second coil conductors 125, 126.

The second carrier plate 730 comprises a fourth vertical connecting structure 741. Unless differences are described, the fourth vertical connecting structure 741 is formed as described for the second vertical connecting structure 735. The fourth vertical connecting structure 741 connects the third conductor structure 744 of the second inclined stator layer 732, which is embodied as a horizontal connecting structure, in particular as a longitudinal connector or cross-connector, in an electrically conducting manner to a first coil conductor 125 of the second longitudinal stator layer 731. The fourth vertical connecting structure 741 extends, like the second vertical connecting structure 735, from the first side 733 of the second carrier plate 730 to the second side 734 of the second carrier plate 730. In the stator assembly 100, a first coil conductor 125 of the first longitudinal stator layer 721 is electrically conductively connected to a first coil conductor 125 of the second longitudinal stator layer 731 via the third vertical connecting structure 740, the third conductor structure 744 and the fourth vertical connecting structure 741.

Instead of or in addition to the third vertical connecting structure 740, the stator assembly 100 may also comprise further vertical connecting structures which, like the third vertical connecting structure 740, extend from the upper side 101 of the stator assembly 100 to the bottom side 102 of the stator assembly 100. Such vertical connecting structures may touch two conductor structures arranged in stator layers 722, 731 other than the first longitudinal stator layer 721 and the second inclined stator layer 732. For example, such a vertical connecting structure may electrically conductively connect a conductor structure on the first longitudinal stator layer 721, e.g. a first coil conductor 125, a longitudinal connector or a cross-connector of the first longitudinal stator layer 721, to a conductor structure of the second longitudinal stator layer 731, e.g. a first coil conductor 125, a longitudinal connector or a cross-connector of the second longitudinal stator layer 731. Such a vertical connecting structure may also electrically conductively connect a conductor structure arranged on the first inclined stator layer 722 to a conductor structure arranged on the second longitudinal stator layer 733 or to a conductor structure arranged on the second inclined stator layer 734.

In addition to the first vertical connecting structures 725, 727, the first carrier board 720 may also include further vertical connecting structures which are embodied analogously to the first vertical connecting structures 725, 727 and which connect second coil conductors 126 arranged on the second side 724 of the first carrier board 720 with conductor structures arranged on the first side 723 of the first carrier board 720. For example, the first carrier plate 720 may comprise a vertical connecting structure which electrically conductively connects a second coil conductor 126 arranged on the second side 724 of the first carrier plate 720 to a longitudinal connector disposed on the first side 723 of the first carrier plate 720.

In addition to the second vertical connecting structures 735, 737, the second carrier plate 730 may also comprise further vertical connecting structures which are embodied analogously to the second vertical connecting structures 735, 737 and which connect second coil conductors 126 arranged on the second side 734 of the second carrier plate 730 with conductor structures arranged on the first side 733 of the second carrier plate 730. For example, the second carrier plate 730 may comprise a vertical connecting structure which electrically conductively connects a second coil conductor 126 arranged on the second side 734 of the second carrier plate 730 to a longitudinal connector arranged on the first side 733 of the second carrier plate 730.

The first vertical connecting structures 725, 727 of the first carrier plate 720 may each comprise conductively coated through-holes in the first carrier plate 720. The second vertical connecting structures 735, 737 and the fourth vertical connecting structure 741 of the second carrier plate 730 may each comprise conductively coated through-holes in the second carrier plate 730.

The through-holes of the first vertical connecting structures 725, 727 and the through-holes of the second vertical connecting structures 735, 737 and the fourth vertical connecting structure 741 may only extend over the respective carrier plate 720, 730 on which the stator layers 721, 722, 731, 732 connected via the respective through-hole are arranged, but not over the entire stator assembly 100. Such through-holes of a stator assembly 100 consisting of a plurality of two-layer carrier plates 720, 730 are also referred to as blind vias or buried vias.

In particular, the vertical connecting structures 725, 727 embodied as blind vias or buried vias extend through the first carrier plate 720 from the first side 723 of the first carrier plate 720 to the second side 724 of the first carrier plate 720. In particular, the vertical connecting structures 735, 737, 741 embodied as blind vias or buried vias extend through the second carrier plate 730 from the first side 733 of the second carrier plate 730 to the second side 734 of the second carrier plate 730. The conductor structures of the longitudinal stator layers 710 and the conductor structures of the inclined stator layers 711 of the individual carrier plates 720, 730 are thus electrically conductively connected to one another, inter alia by vertical connecting structures 725, 727, 735, 737, 741 formed exclusively on the relevant carrier plate 720, 730.

The first coil conductors 125 of the longitudinal stator layer 710 and the second coil conductors 126 of the inclined stator layers 711 of the individual carrier plates 720, 730 are each electrically insulated from one another. The vertical connecting structures 725, 727, which are exclusively embodied on the first carrier plate 720, each connect a first coil conductor 125 on the first side 723 of the first carrier plate 720 in an electrically conductive manner to a horizontal connecting structure, in particular to a longitudinal connector or a cross-connector, on the second side 724 of the first carrier plate 720 or a second coil conductor 126 on the second side 724 of the first carrier plate 720 in an electrically conductive manner to a horizontal connecting structure, in particular a longitudinal connector or a cross-connector, on the first side 723 of the first carrier plate 720. In analogy, the vertical connecting structures 735, 737, 741 exclusively embodied on the second carrier plate 730, each connect a first coil conductor 125 on the first side 733 of the second carrier plate 730 to a horizontal connecting structure, in particular with a longitudinal connector or a cross-connector, on the second side 734 of the second carrier plate 730 or a second coil conductor 126 on the second side 734 of the second carrier plate 730 to a horizontal connecting structure, in particular a longitudinal connector or a cross-connector, on the first side 733 of the second carrier plate 720.

The third vertical connecting structure 740 may have a conductively coated through-hole through the entire stator assembly 100, which in the third direction 15 extends over the entire stator assembly 100. In particular, the through-hole of the third vertical connecting structure 740 may in the third direction 15 extend from the upper side 101 of the stator assembly 100 to the bottom side 102 of the stator assembly 100. Such through-holes are also referred to as through vias or through-hole vias.

Figure 9:
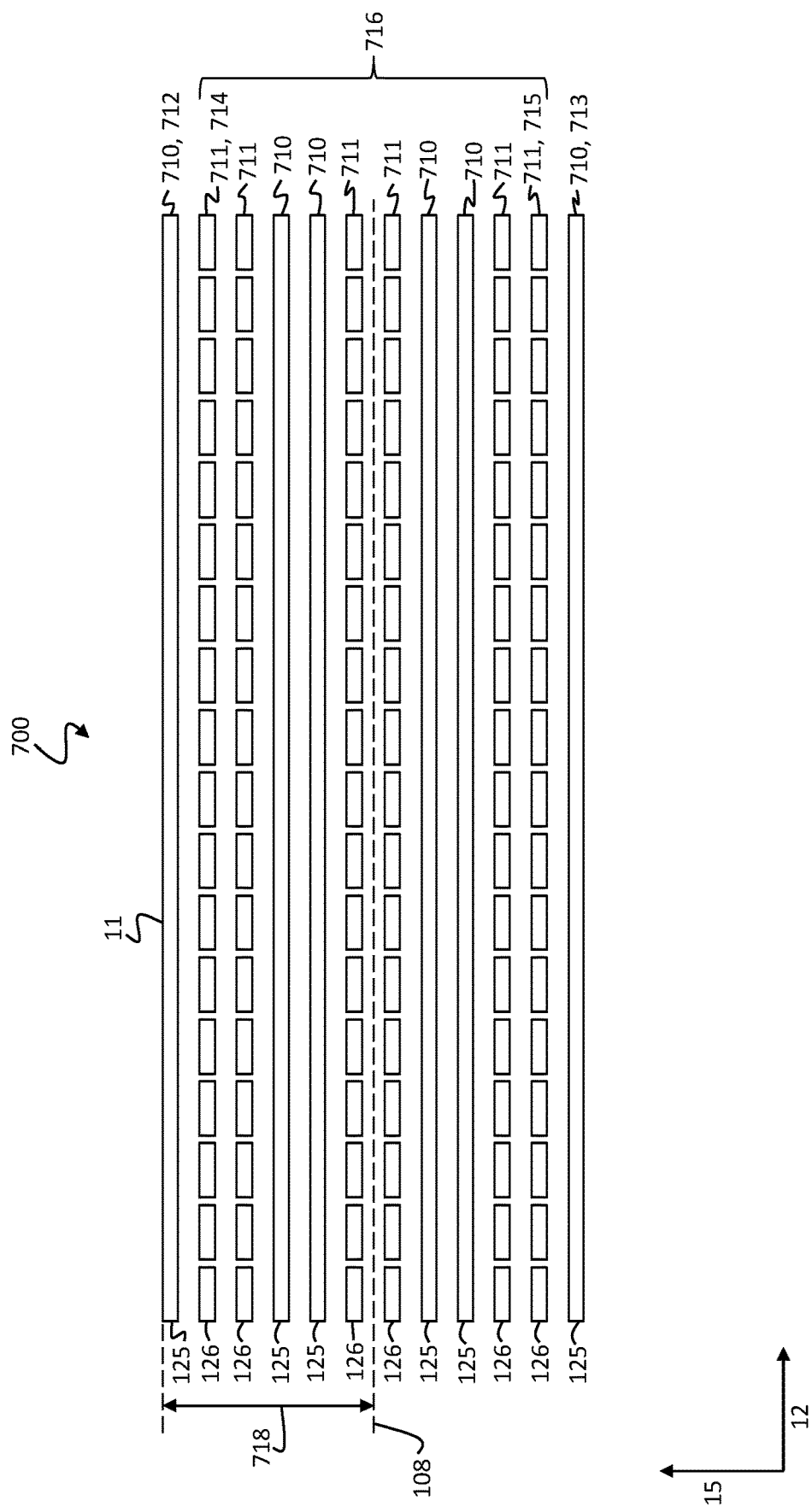
FIG. 9 shows a first further stator assembly for the stator module in a sectional view.

FIG. 9 shows a schematic, not-to-scale depiction of a first further stator assembly 700 of the stator module 10 in a sectional view in which the sectional plane is oriented perpendicularly to the second direction 14. Unless differences are described, the first further stator assembly 700 is embodied as described for the stator assembly 100. In the first further stator assembly 700, the first direction 12 is in particular oriented perpendicularly with regard to the second direction 14.

The first further stator assembly 700 comprises a first arrangement of a total of six longitudinal stator layers 710 and a second arrangement of a total of six inclined stator layers 711. Thus, the first total number of longitudinal stator layers 710 corresponds to the second total number of inclined stator layers 711. Between the uppermost stator layer 712 and the lowermost stator layer 713, the first further stator assembly 700 comprises inner layers 716, which are in the third direction 15 alternatingly embodied as two adjacent inclined stator layers 711 and two adjacent longitudinal layers 710.

In the third direction 15, the first further stator assembly 700 comprises, below an uppermost stator layer 712, a sequence of two adjacent inclined stator layers 711, two adjacent longitudinal stator layers 710, two adjacent inclined stator layers 711, two adjacent longitudinal stator layers 710, two adjacent inclined stator layers 711 and a lowermost stator layer 713 formed as a longitudinal stator layer 710.

The uppermost stator layer 712 of the first further stator assembly 700 and the lowermost stator layer 713 of the first further stator assembly 700 are embodied as longitudinal stator layers 710 and a second uppermost stator layer 714 and a second lowermost stator layer 715 are embodied as inclined stator layers 711. In the third direction 15, the longitudinal stator layers 710 are arranged at most on one side next to an inclined stator layer 711 and in the third direction 15, the inclined stator layers 711 are arranged at most on one side next to a longitudinal stator layer 710. In particular, the uppermost stator layer 712 embodied as longitudinal stator layer 710 is only on its bottom side arranged next to an inclined stator layer 711, i.e. next to the second uppermost stator layer 714 embodied as inclined stator layer 711. In addition, the lowermost stator layer 113 embodied as longitudinal stator layer 710 is only on its upper side arranged next to an inclined stator layer 711, i.e. next to the second lowermost stator layer 715 embodied as an inclined stator layer 711.

Inner layers 716 of the first further stator assembly 700 embodied as longitudinal stator layers 710 are arranged on one side next to a longitudinal stator layer 710 and on the other side next to an inclined stator layer 711. The inner layers 716 of the first further stator assembly 700 embodied as inclined stator layers 711 are each on one side arranged next to an inclined stator layer 711 and on the other side next to a longitudinal stator layer 710. This means that in the first further stator assembly 700, in the third direction 15, exactly one inclined stator layer 711 is arranged next to each longitudinal stator layer 710 and exactly one longitudinal stator layer 710 next to each inclined stator layer 711.

In the first further stator assembly 700, the first arrangement of the longitudinal stator layers 710 and the second arrangement of the inclined stator layers 711 have a shared center plane 108 which is, in the third direction 15, arranged centrally between the uppermost stator layer 712 and the lowermost stator layer 713 of the first further stator assembly 700. The first arrangement of longitudinal stator layers 710 and the second arrangement of inclined stator layers 711 have an equal mean distance 718 from the stator surface 11 of the first further stator assembly 700. In the first further stator assembly 700, the first arrangement of longitudinal stator layers 710 and the second arrangement of inclined stator layers 711 are in the third direction 15 embodied symmetrically to the shared center plane 108. In the first further stator assembly 700, a distance of the shared center plane 108 from the stator surface 11 corresponds to the mean distance 718 of the longitudinal stator layers 710 and the inclined stator layers 711 from the stator surface 11.

The first further stator assembly 700 only comprises six stator-layer changes, in which the orientation of the coil conductors 125, 126 changes in the third direction 15 and in which first coil conductors 125 extending in the first direction 12 are arranged next to second coil conductors 126 extended in the second direction 14. Thus, in the first further stator assembly 700, the orientation of the coil conductors 125, 126 changes only six times in the third direction 15. This means that the capacitance of the stator-layer arrangement of the first further stator assembly 700 is particularly low. In particular, the capacitance is lower than in a stator-layer arrangement in which longitudinal stator layers 710 and inclined stator layers 711 are alternatingly arranged in the third direction 15.

Like the stator assembly 100, the first further stator assembly 700 may also comprise two-layer carrier plates arranged on top of one another in the third direction 15, on the first side of which longitudinal stator layer 710 and on the second side of which inclined stator layer 711 is respectively arranged.

Figure 10:
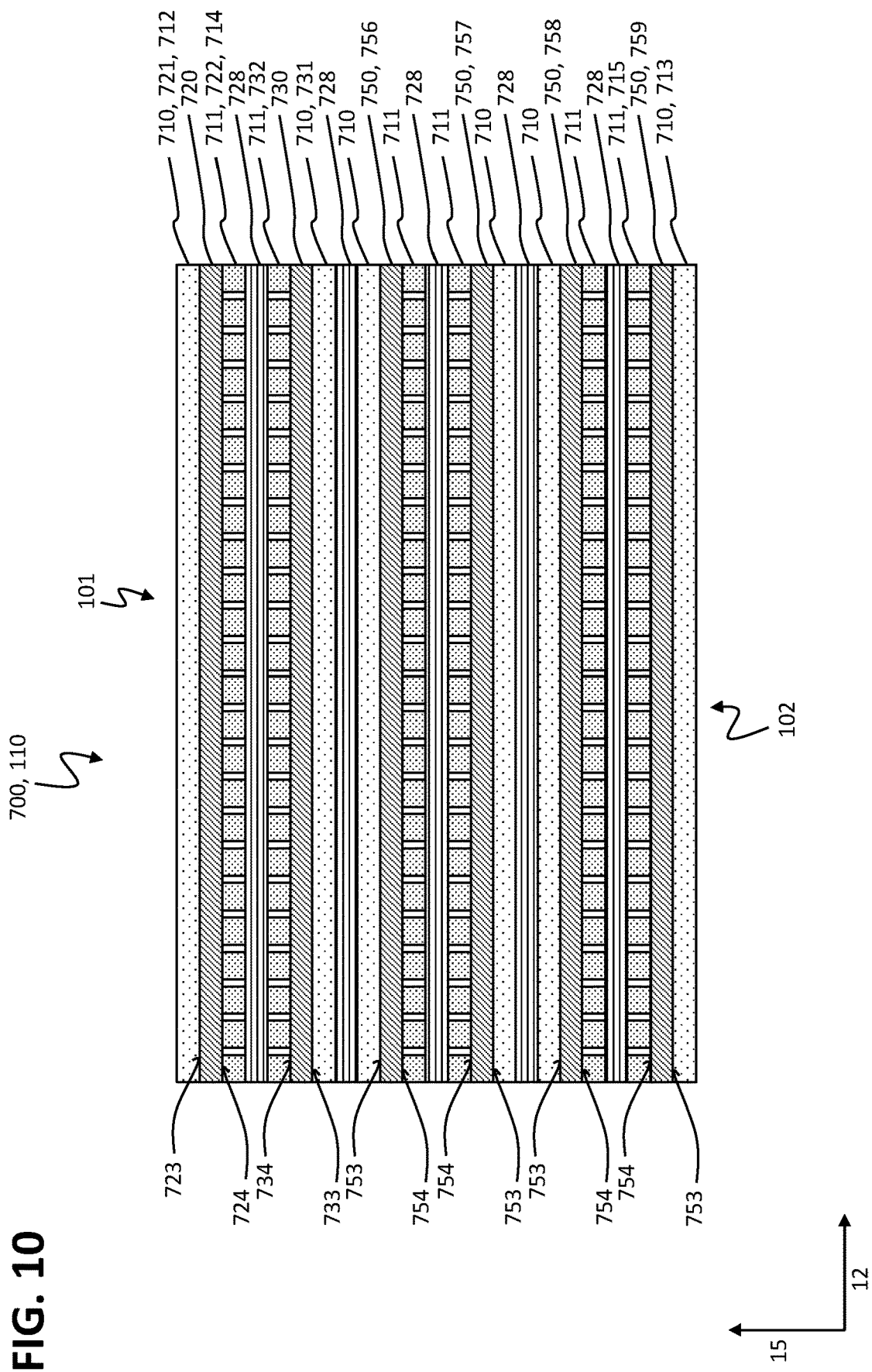
FIG. 10 shows the carrier plates of the first further stator assembly in a sectional view.

FIG. 10 shows a further schematic, not-to-scale depiction of the first further stator assembly 700 in a sectional view, the sectional plane being oriented perpendicularly to the second direction 14.

Like the stator assembly 100, the first further stator assembly 700 also comprises a first carrier plate 720 and a second carrier plate 730. The first carrier plate 720 of the first further stator assembly 700 is embodied as described for the first carrier plate 720 of stator assembly 100. The second carrier plate 730 of the first further stator assembly 700 is formed as described for the second carrier plate 730 of stator assembly 100. In particular, on a first side 723 of the first carrier plate 720 a longitudinal stator layer 710 referred to as a first longitudinal stator layer 721 is arranged, and on a second side 724 of the first carrier plate 720 opposite to the first side 723 in the third direction 15 there is an inclined stator layer 711 referred to as a first inclined stator layer 722 is arranged, on a first side 733 of the second carrier plate 730, a longitudinal stator layer 710 referred to as second longitudinal stator layer 731 is arranged and on a second side 734 of the second carrier plate 720 opposite to the first side 733 in the third direction 15, an inclined stator layer 711 designated as second inclined stator layer 732 is arranged.

The first side 723 of the first carrier plate 720 is in the third direction 15 arranged above the second side 724 of the first carrier plate 720. The first side 733 of the second carrier plate 730 is in the third direction 15 arranged below the second side 734 of the second carrier plate 730. The first carrier plate 720 and the second carrier plate 730 are in the third direction 15 arranged side by side, the first carrier plate 720 being arranged above the second carrier plate 730. The second side 724 of the first carrier plate 720 is arranged facing the second side 734 of the second carrier plate 730.

The first further stator assembly 700 comprises, in addition to the first and the second carrier plate 720, 730, four further carrier plates 750. Unless differences are described, the further carrier plates 750 are embodied and arranged as described for the first and second carrier plate 720, 730. In particular, the further carrier plates 750 each comprise a first side 753 with a longitudinal stator layer 710 and a second side 754 with an inclined stator layer 711. The carrier plates 720, 730, 750 of the first further stator assembly 700 are in the third direction 15 arranged on top of one another and aligned in parallel to one another. The facing sides of adjacent carrier plates 720, 730, 750 are in the third direction 15 alternatingly embodied as first sides 723, 733, 753 facing one another or as second sides 724, 734, 754 facing one another.

In the first further stator assembly 700, the first carrier plate 720 is in the third direction 15 arranged as the uppermost carrier plate above all other carrier plates 730, 750. The first longitudinal stator layer 721 forms the uppermost stator layer 712 and the first inclined stator layer 722 forms the second uppermost stator layer 714 of the first further stator assembly 700. The first side 723 of the first carrier plate 720 forms an upper side 101 of the first further stator assembly 700.

In the third direction 15 below the first carrier plate 720, a sequence of the second carrier plate 730, a first further carrier plate 756, a second further carrier plate 757, a third further carrier plate 758 and a fourth further carrier plate 759 are arranged. The first side 733 of the second carrier plate 730 is arranged facing the first side 753 of the first further carrier plate 756, the second side 754 of the first further carrier plate 756 is arranged facing the second side 754 of the second further carrier plate 757, the first side 753 of the second further carrier plate 757 is arranged facing the first side 753 of the third further carrier plate 758 and the second side 754 of the third further carrier plate 758 is arranged facing the second side 754 of the fourth further carrier plate 759. The first side 753 of the fourth further carrier plate 759 forms the bottom side 102 of the first further stator assembly 700.

An insulating layer 728 embodied like the insulating layer 728 of the stator assembly 100 is respectively arranged between the carrier plates 720, 730, 750.

The first further stator assembly 700 comprises a multi-layer stator-layer arrangement having an even number of stator layers. The first further stator assembly 700 comprises in particular a twelve-layer stator-layer arrangement. The first further stator assembly 700 comprises a plurality of two-layer carrier plates 720, 730, 750 arranged on top of one another in the third direction 15. In particular, the first further stator assembly 700 comprises six two-layer carrier plates 720, 730, 750 arranged on top of one another in the third direction 15.

In the first further stator assembly 700, inside the stator assembly 700, i.e. apart from the uppermost stator layer 712 and the lowermost stator layer 713, an inclined stator layer 711 is in the third direction 15 arranged next to each longitudinal stator layer 710 and a longitudinal stator layer 710 next to each inclined stator layer 711. Thereby, each longitudinal stator layer 710 is arranged on the first side 723, 733, 753 and each adjacently arranged inclined stator layer 711 on the second side 724, 734, 754 of the respective two-layer supporting plates 720, 730, 750. In particular, the first further stator assembly 700 respectively comprises exclusively two-layer carrier plates 720, 730, 750, on the first side 723, 733, 753 of which a longitudinal stator layer 710 is arranged and on the second side 724, 734, 754 of which an inclined stator layer 711 is arranged.

Figure 11:
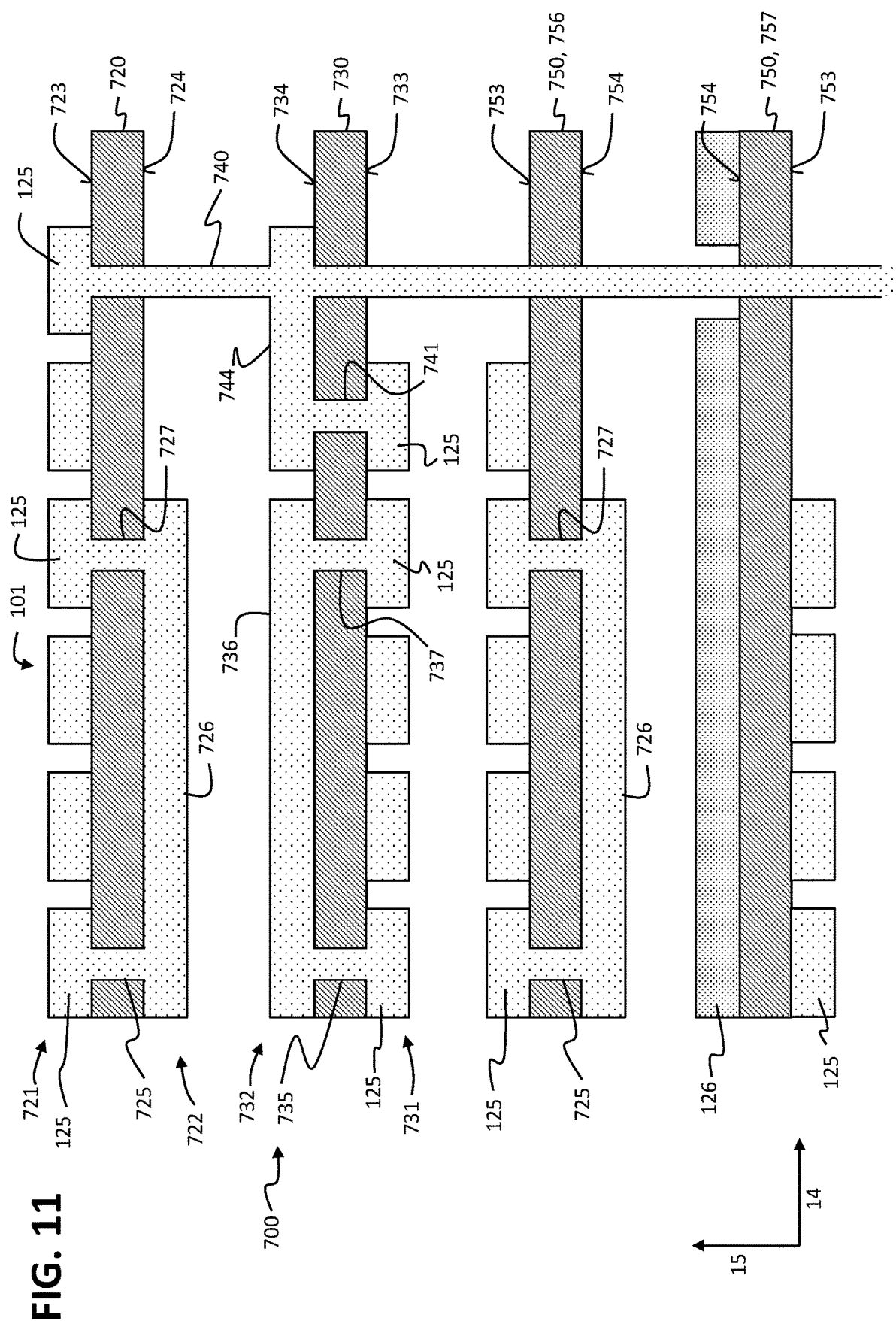
FIG. 11 shows the carrier plates of the first further stator assembly in a further sectional view having vertical connecting structures and horizontal connecting structures.

FIG. 11 shows a schematic, not-to-scale depiction of a section of the first further stator assembly 700 in a further, enlarged sectional view. In the further sectional view shown in FIG. 11, the sectional plane is oriented perpendicularly to the first direction 12, unlike the sectional view shown in FIG. 10. In the schematic view of FIG. 11, the insulating layers 728 are arranged between the carrier plates 720, 730, 750.

Like the stator assembly 100, the first further stator assembly 700, as well, comprises connecting structures. Unless differences are described, the connecting structures of the first further stator assembly 700 are embodied as described for the connecting structures of stator assembly 100. In particular, the first further stator assembly 700 comprises the first vertical connecting structure 725 described in connection with the stator assembly 100, further first vertical connecting structure 727, second vertical connecting structure 735, further second vertical connecting structure 737 and fourth vertical connecting structure 741.

The first further stator assembly 700 comprises a third vertical connecting structure 740 which, unless differences are described, is embodied like the third vertical connecting structure 740 of stator assembly 100. In particular, the third vertical connecting structure 740 of the first further stator assembly 700 extends in the third direction 15 from the upper side 101 of the first further stator assembly 700 to the bottom side 102 of the first further stator assembly 700. In particular, the third vertical connecting structure 740 may extend through all carrier plates 720, 730, 750 and all insulating layers 728 of the first further stator assembly 700. The third vertical connecting structure 740 may include a conductively coated through-hole through the first further stator assembly 700.

The third vertical connecting structure 740 may only touch conductor structures of two of the twelve stator layers of the first further stator assembly 700 and may be embodied at a distance from the conductor structures of all remaining stator layers of the first further stator assembly 700. In particular, the third vertical connecting structure 740, as shown in FIG. 11, may touch conductor structures of the first longitudinal stator layer 721 and conductor structures of the second inclined stator layer 732 and thus establish an electrically conductive connection between the conductor structures of the first longitudinal stator layer 721 and the conductor structures of the second inclined stator layer 732. In this context, the third vertical connecting structure 740 is electrically conductively connected either on the first longitudinal stator layer 721 with conductor structures formed as first coil conductors 725 or on the second inclined stator layer 732 with conductor structures formed as second coil conductors 126 and is embodied on the respective other stator layer 721, 732 in an electrically insulated manner with regard to the coil conductors 125, 126 arranged there, so that the first coil conductors 125 are formed electrically insulated from the second coil conductors 126.

The further carrier plates 750 of the first further stator assembly 700 may also comprise vertical connecting structures which are embodied as the first vertical connecting structure 725, the further first vertical connecting structure 727, the second vertical connecting structure 735, the further second vertical connecting structure 737 or the fourth vertical connecting structure 741. In particular, the further support panels 750 may each have vertical connecting structures extending from the first side 753 to the second side 754 of the respective further support panel 750 and terminating at the first and second sides 753, 754 of the respective support panel. Vertical connecting structures of two, of a plurality of or of each of the carrier plates 720, 730, 750 may be arranged on top of one another in the third direction 15 and may each be electrically insulated from one another by the insulating layers 728.

Alternative embodiments of the first further stator assembly 700 may also have a smaller or larger number of stator layers or of two-layer carrier plates.

Figure 12:
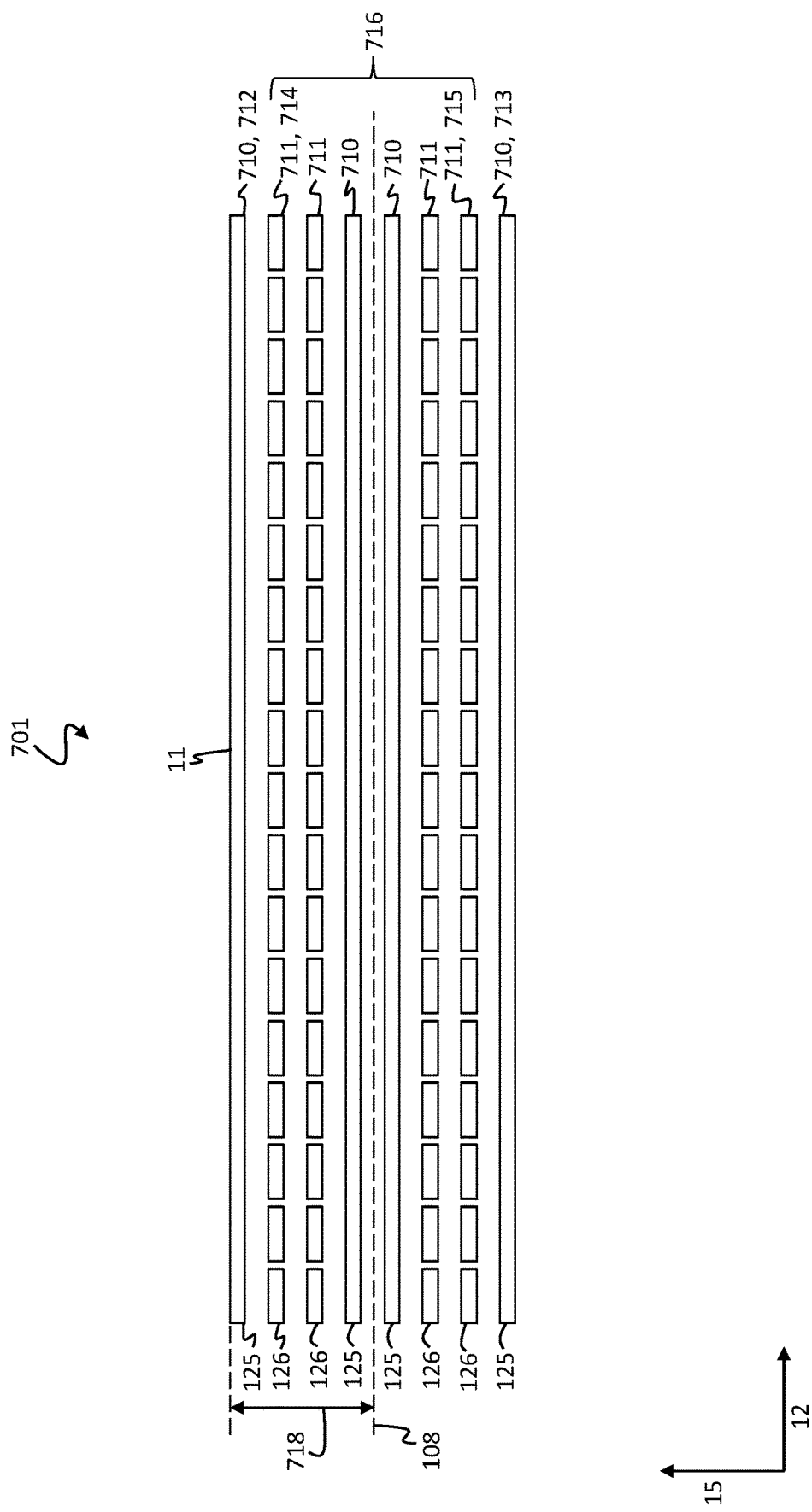
FIG. 12 shows a second further stator assembly for the stator module in a sectional view.

FIG. 12 shows a schematic, not-to-scale depiction of a second further stator assembly 701 in a sectional view, with the sectional plane oriented perpendicularly to the second direction 14. Unless differences are described, the second further stator assembly 701 is embodied as described for the first further stator assembly 700.

The second further stator assembly 701 in total comprises a multi-layer stator-layer arrangement with an even number of stator layers 710, 711. The second further stator assembly 701 has a total of eight stator layers, four stator layers being embodied as longitudinal stator layers 710 and four stator layers being embodied as inclined stator layers 711. At most one inclined stator layer 711 is arranged next to each longitudinal stator layer 710 and at most one longitudinal stator layer 710 is arranged next to each inclined stator layer 711. The arrangement of the longitudinal stator layers 710 and of the inclined stator layers 711 is symmetrical to a shared center plane 108 of the longitudinal stator layers 710 and the inclined stator layers 711. In addition, the longitudinal stator layers 710 and the inclined stator layers 711 have the same mean distance 718 from the stator surface 11 of the second further stator assembly 701.

The second further stator assembly 701 may comprise several two-layer carrier plates arranged 15 on top of one another in the third direction 15. In particular, the second further stator assembly 701 may comprise four two-layer carrier plates arranged on top of one another in the third direction 15. The carrier plates may be formed and arranged as described for the first and second carrier plates 720, 730 of the stator assembly 100 and for the further carrier plates 750 of the first further stator assembly 700.

In the second further stator assembly 701, an inclined stator layer 711 is, in the third direction 15, arranged next to each longitudinal stator layer 710 and a longitudinal stator layer 710 next to each inclined stator layer 711. Each longitudinal stator layer 710 may in this context be arranged on the first side and each adjacent inclined stator layer 711 on the second side of the two-layer carrier plate. In particular, the second further stator assembly 701 may comprise exclusively two-layer carrier plates, respectively, on the first side of which a longitudinal stator layer 710 is arranged and on the second side of which an inclined stator layer 711 is arranged.

Figure 13:
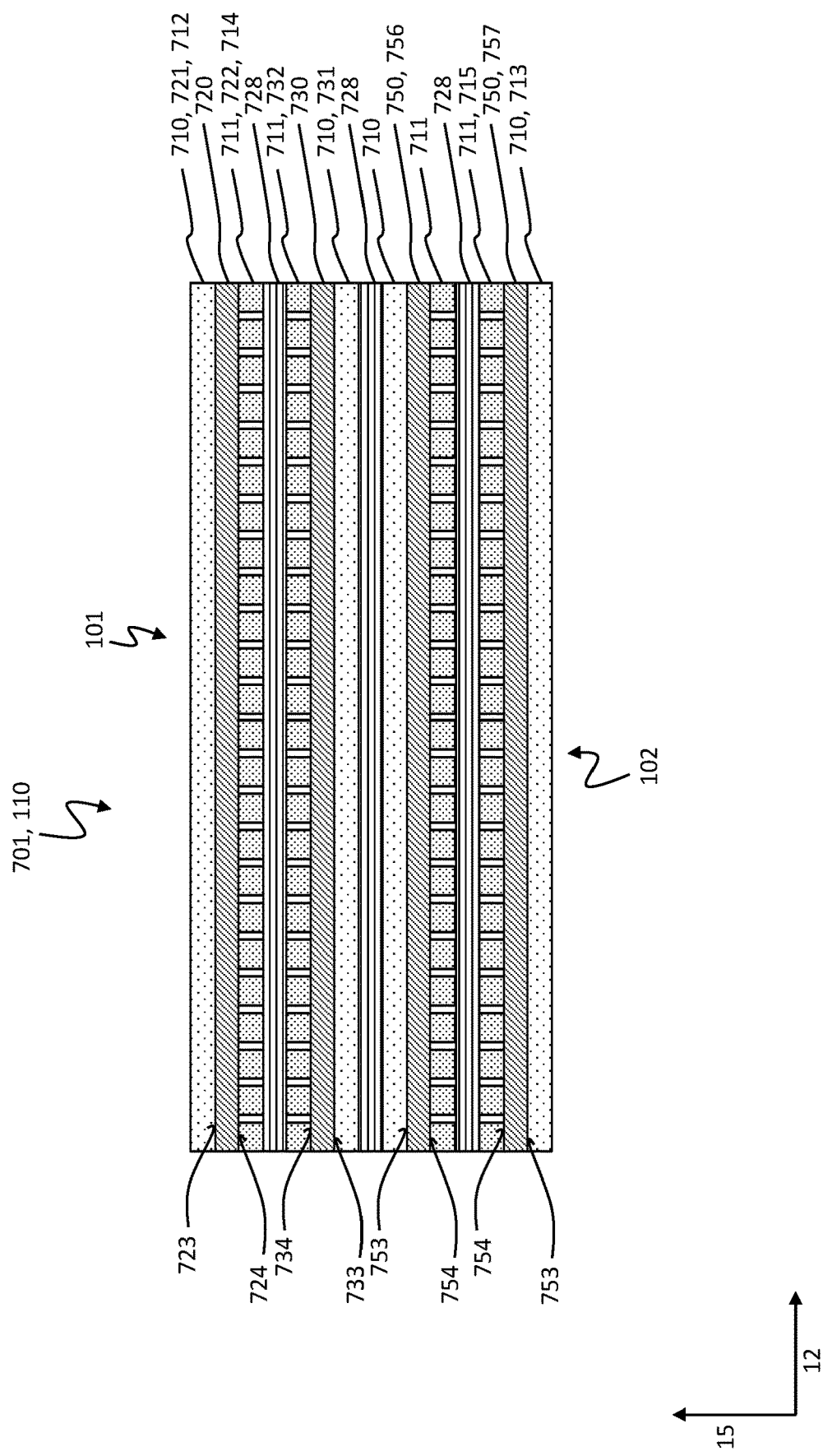
FIG. 13 shows carrier plates of the second further stator assembly in a sectional view.

The second further stator assembly 701 may in particular comprise four two-layer carrier plates, on the first side of which a longitudinal stator layer 710 is respectively arranged and on the second side of which an inclined stator layer 711 is respectively arranged. In particular, the second further stator assembly 701, as shown in FIG. 13, may comprise the first carrier plate 720, second carrier plate 730, first further carrier plate 756 and second further carrier plate 757 described in connection with the first further stator assembly 701. The first side 723 of the first carrier plate 720 may form an upper side 101 and the first side 753 of the second further carrier plate 757 may form a bottom side 102 of the second further stator assembly 701. The two-layer carrier plates 720, 730, 756, 757 of the second further stator assembly 701 may be arranged on top of one another in the third direction 15, wherein facing sides of adjacent carrier plates 720, 730, 750 are alternatingly formed in the third direction 15 as facing first sides 723, 733, 753 or as facing second sides 724, 734, 754.

The second further stator assembly 701 has only four stator-layer changes, in which the orientation of the coil conductors 125, 126 changes in the third direction 15 and in which first coil conductors 125 extending in the first direction are arranged next to second coil conductors 126 extending in the second direction 14. Thus, in the second further stator assembly 701, the orientation of the coil conductors 125, 126 changes only four times in the third direction 15. This means that the capacitance of the stator-layer arrangement of the second further stator assembly 701 is particularly low. In particular, the capacitance is lower than in a stator-layer arrangement in which longitudinal stator layers 710 and inclined stator layers 711 are alternatingly arranged in the third direction 15.

Figure 14:
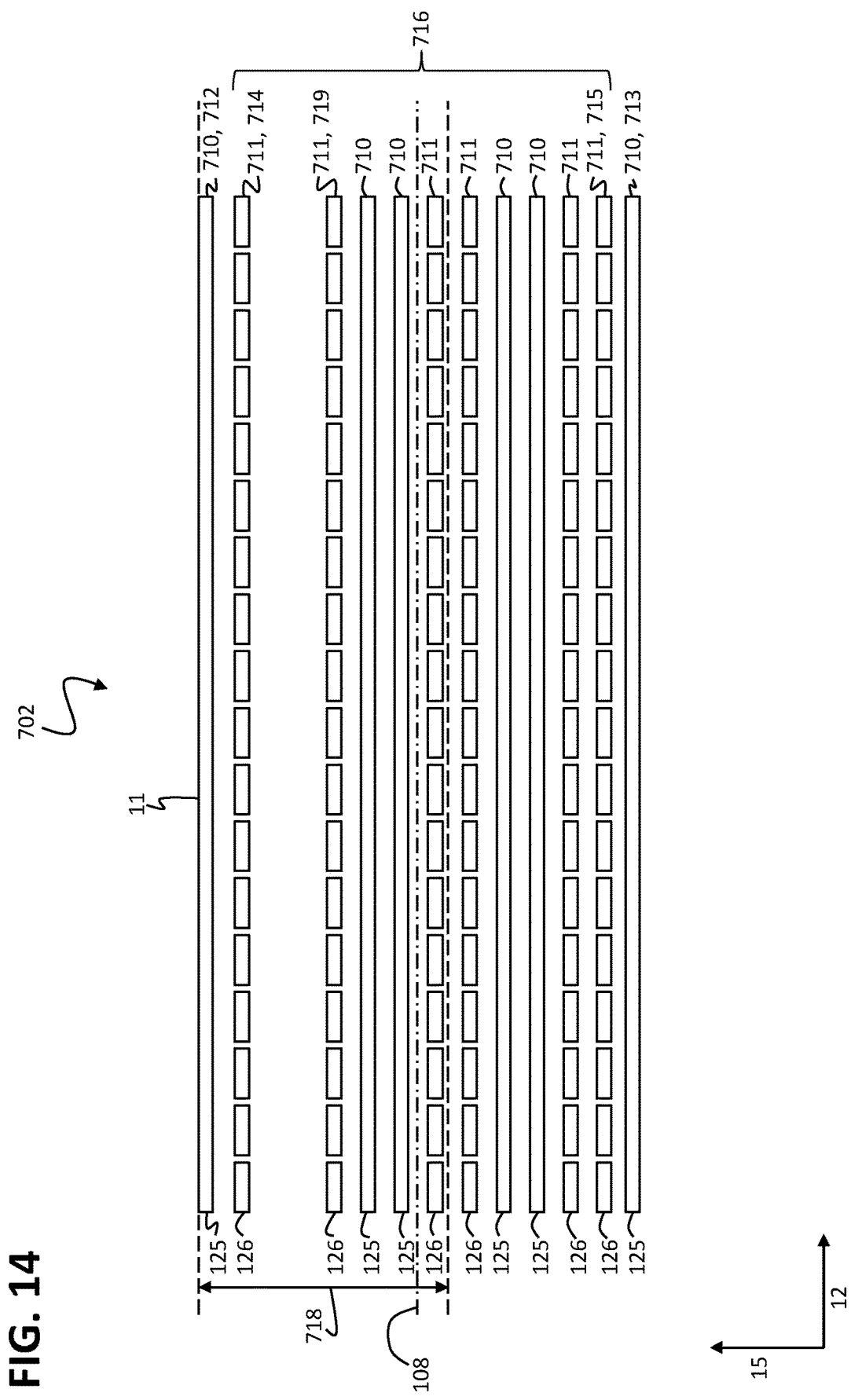
FIG. 14 shows a third further stator assembly for the stator module in a sectional view.

FIG. 14 shows a schematic, not-to-scale depiction of a third further stator assembly 702 in a sectional view, with the sectional plane oriented perpendicularly to the second direction 14. Unless differences are described, the third further stator assembly 702 is embodied as described for the first further stator assembly 700.

In contrast to the stator assembly 100 of the first further stator assembly 700 and of the second further stator assembly 701, in the third further stator assembly 702 not all stator layers in the third direction 15 are at the same distance from each other. In the third further stator assembly 702, a distance between the second uppermost stator layer 714 and a next lower stator layer 719 arranged below the second uppermost stator layer 714 is larger than the distance between the remaining stator layers of the third further stator assembly 702. In the third further stator assembly 702, the first arrangement of longitudinal stator layers 710 and the second arrangement of inclined stator layers 711 have an equal mean distance 718 from a stator surface 11 of the third further stator assembly 702. However, the mean distance 718 does not correspond to the distance of the center plane 108 from the stator surface 11.

The third further stator assembly 702 has a total of twelve stator layers, six of which are longitudinal stator layers 710 and six are inclined stator layers 711. Next to each longitudinal stator layer 710 in the third direction 15, at most one inclined stator layer 711 and next to each inclined stator layer 711 in the third direction 15 at most one longitudinal stator layer 710 is arranged. In particular, exactly one inclined stator layer 711 is arranged next to each longitudinal stator layer 710 in the third direction 15 and exactly one longitudinal stator layer 710 is arranged next to each inclined stator layer 711 in the third direction 15.

Figure 15:
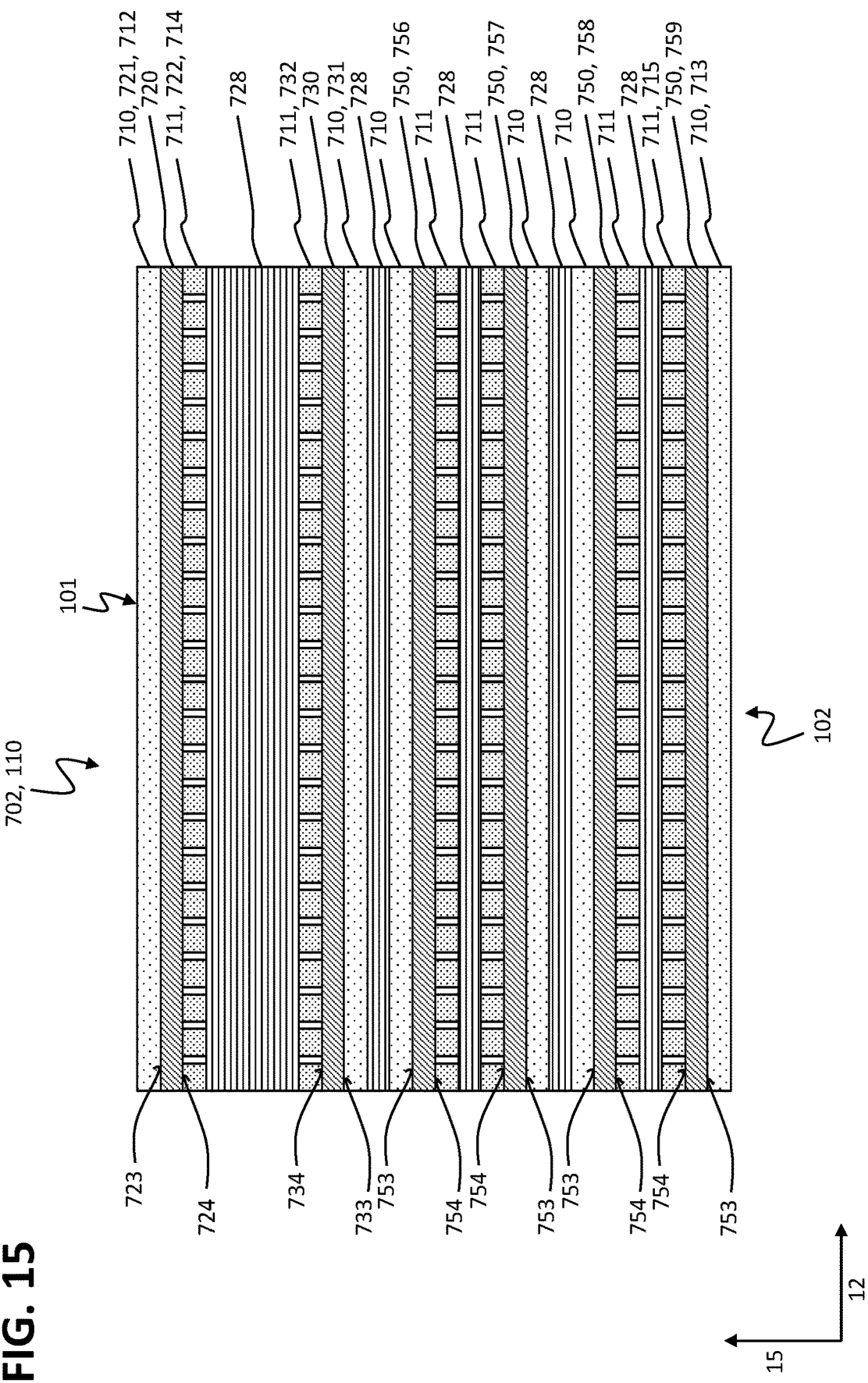
FIG. 15 shows carrier plates of the third further stator assembly in a sectional view.

The third further stator assembly 702 may, as the first further stator assembly 700, comprise a total of six two-layer carrier plates, on the first side of which a respective longitudinal stator layer 710 is arranged and on the second side of which a respective inclined stator layer 711 is arranged. In particular, the third further stator assembly 702, as shown in FIG. 15, may comprise the first carrier plate 720, the second carrier plate 730 and the further carrier plates 750. The two-layer carrier plates 720, 730, 750 may be arranged on top of one another in the third direction 15, wherein facing sides of adjacent carrier plates 720, 730, 750 are in the third direction 15 alternatingly embodied as facing first sides 723, 733, 753 or as facing second sides 724, 734, 754. On its second side 724, the first carrier plate 720 may comprise on its first side 723 the uppermost stator layer 712 and the second uppermost stator layer 714. The second carrier plate 730 may comprise the next lower stator layer 719 on its second side 734 and the longitudinal stator layer 710 below the next lower stator layer 719 on its first side 733. The first carrier plate 720 and the second carrier plate 730 of the third further stator assembly 702 may be embodied and arranged as described for the first and second carrier plates 720, 730 of the first further stator assembly 700.

The further two-layer carrier plates 750 of the third further stator assembly 702 may be embodied and arranged as described for the further carrier plates 750 of the first further stator assembly 700. A distance between the first and second carrier plates 720, 730 of the third further stator assembly 702 may be larger in the third direction 15 than the distance between the remaining carrier plates 730, 750 of the third further stator assembly 702.

The third further stator assembly 702 merely comprises six stator-layer changes in which the orientation of the coil conductors 125, 126 changes in the third direction 15 and in which first coil conductors 125 extending in the first direction 12 are arranged next to second coil conductors 126 extending in the second direction 14. Thus, in the second further stator assembly 702, the orientation of the coil conductors 125, 126 changes only six times in the third direction 15. As a result, the capacitance of the stator-layer arrangement of the third further stator assembly 702 is particularly low. In particular, the capacitance is lower than in a stator-layer arrangement in which longitudinal stator layers 710 and inclined stator layers 711 are in each case alternatingly arranged in the third direction 15.

Figure 16:
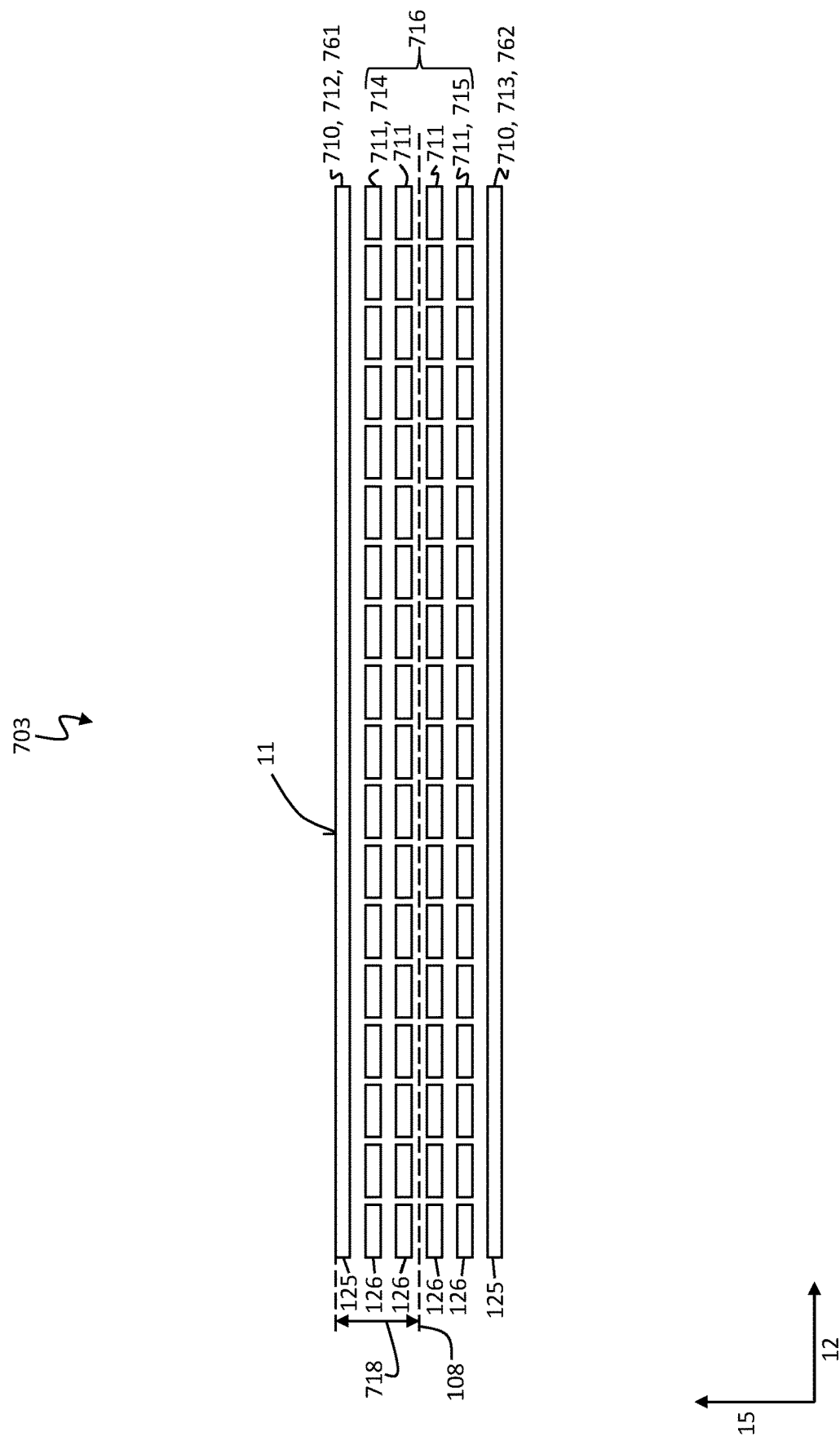
FIG. 16 shows a fourth further stator assembly for the stator module in a sectional view.

FIG. 16 shows a schematic, not to scale depiction of a fourth further stator assembly 703 in a sectional view, with the sectional plane oriented perpendicularly to the second direction 14. Unless differences are described, the fourth further stator assembly 703 is embodied as described for stator assembly 100.

The fourth further stator assembly 703 comprises at least two longitudinal stator layers 710 and at least three inclined stator layers 711. An uppermost stator layer 712 and a lowermost stator layer 713 of the fourth further stator assembly 703 are each embodied as longitudinal stator layer 710.

The fourth further stator assembly 703 particularly comprises a total of six stator layers 710, 711. The fourth further stator assembly 703 comprises, in the third direction 15, four inner layers 716 arranged between the uppermost and the lowermost stator layers 712, 713, which are embodied as inclined stator layers 711. A second uppermost stator layer 714 and a second lowermost stator layer 715 of the fourth further stator assembly 703 are each embodied as inclined stator layers 711. In the third direction 15, a longitudinal stator layer 710, four inclined stator layers 711 and a longitudinal stator layer 710 are arranged side by side in the fourth further stator assembly 703.

In the fourth further stator assembly 703, the longitudinal stator layers 710 are in the third direction 15 arranged at most on one side next to an inclined stator layer 711 and the inclined stator layers 711 in the third direction 15 are arranged at most on one side next to a longitudinal stator layer 710. In particular, in the fourth further stator assembly 703, only two longitudinal stator layers 710 are arranged in the third direction 15 next to an inclined stator layer 711. In addition, only two inclined stator layers 711 are arranged in the third direction 15 next to a longitudinal stator layer 710.

In the fourth further stator assembly 703, all inclined stator layers 711 in the third direction 15 are arranged directly next to each other. In particular, none of the longitudinal stator layers 710 is arranged between the inclined stator layers 711. In the fourth further stator assembly 703, a first part 761 of the longitudinal stator layers 710 in the third direction 15 is arranged above the inclined stator layers 711 and a second part 762 of the longitudinal stator layers 710 in the third direction 15 is arranged below the inclined stator layers 711.

The first part 761 and the second part 762 of the longitudinal stator layers 710 each comprise an equal number of longitudinal stator layers 710. In the fourth further stator assembly 703, the first part 761 and the second part 762 each comprise a longitudinal stator layer 710.

The longitudinal stator layers 710 and the inclined stator layers 711 of the fourth further stator assembly 703 have an equal mean distance 718 from a stator surface 11 of the fourth further stator assembly 703 in the third direction 15. The arrangement of the longitudinal stator layers 710 and the inclined stator layers 711 of the fourth further stator assembly 703 is symmetrical to a shared center plane 108 of the longitudinal stator layers 710 and of the inclined stator layers 711.

The fourth further stator assembly 703 merely comprises two stator-layer changes in which the orientation of the coil conductors 125, 126 changes in the third direction 15 and in which first coil conductors 125 extending in the first direction 12 are arranged next to second coil conductors 126 extending in the second direction 14. In particular, the fourth further stator assembly 703 has a first stator-layer change between the uppermost stator layer 712 and the second uppermost stator layer 714, in which the orientation of the coil conductors 125, 126 changes in the third direction 15, and a second stator-layer change between the second lowermost stator layer 715 and the lowermost stator layer 713, in which the orientation of the coil conductors 125, 126 changes in the third direction 15. Thus, the orientation of the coil conductors 125, 126 changes only twice in the fourth further stator assembly 703 in the third direction 15. As a result, the capacitance of the stator-layer arrangement of the fourth further stator assembly 703 is particularly low. In particular, the capacitance is lower than in a stator-layer arrangement in which longitudinal stator layers 710 and inclined stator layers 711 are alternatingly arranged in the third direction 15.

Figure 17:
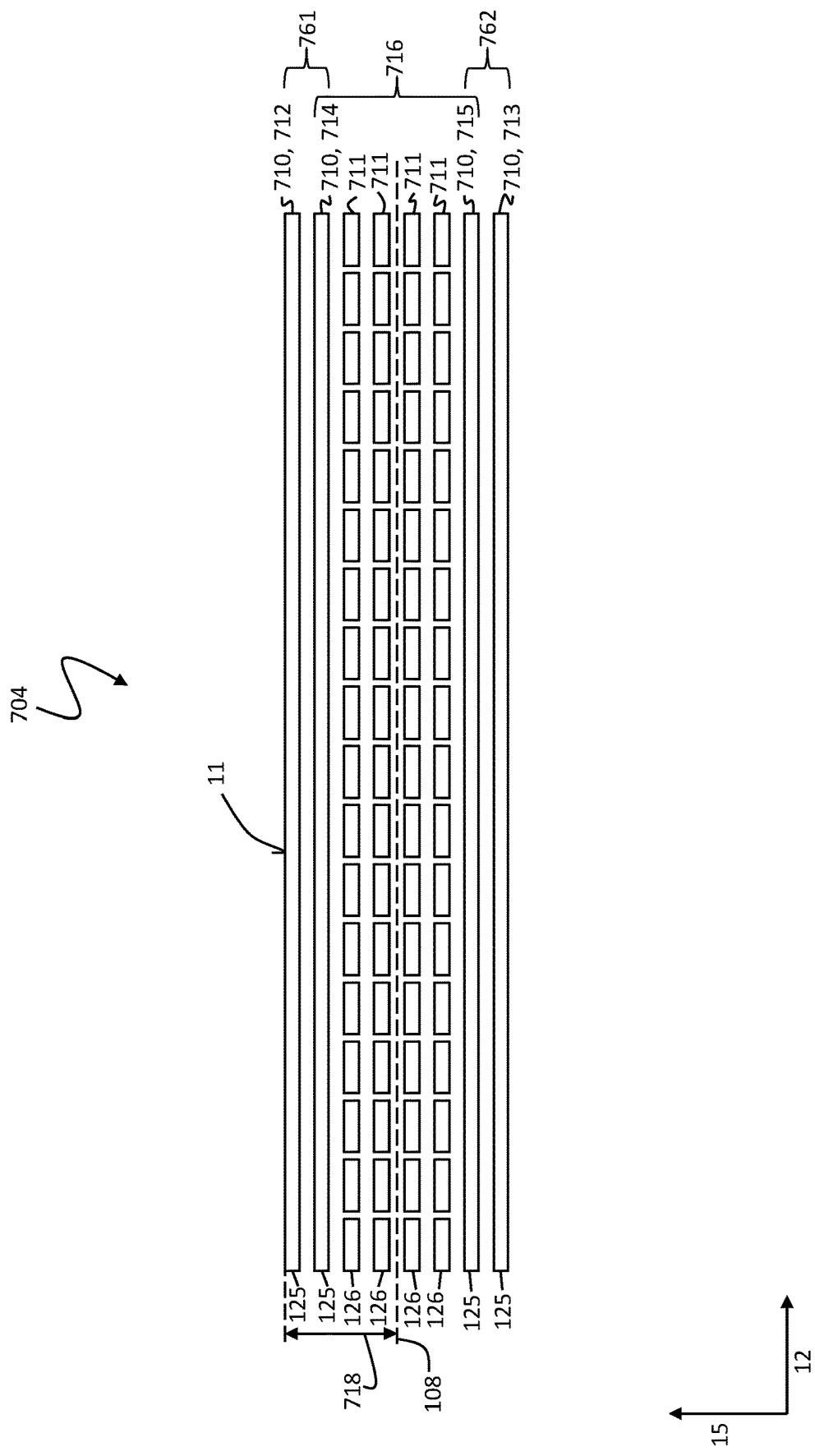
FIG. 17 shows a fifth further stator assembly for the stator module in a sectional view.

FIG. 17 shows a schematic, not-to-scale depiction of a fifth further stator assembly 704 in a sectional view, with the sectional plane oriented perpendicular to the second direction 14. Unless differences are described, the fifth further stator assembly 704 is embodied as described for stator assembly 100.

The fifth further stator assembly 704 comprises at least two longitudinal stator layers 710 and at least three inclined stator layers 711. An uppermost stator layer 712 and a lowermost stator layer 713 of the fifth further stator assembly 704 are each embodied as longitudinal stator layer 710.

The fifth further stator assembly 704 comprises a total of eight stator layers 710, 711. The fifth further stator assembly 704 comprises six inner layers 716 located in the third direction 15 between the uppermost and the lowermost stator layers 712, 713. A second uppermost stator layer 714 and a second lowermost stator layer 715 of the fifth further stator assembly 704 are each embodied as longitudinal stator layers 710, the remaining inner layers 716 are embodied as inclined stator layers 711. In the third direction 15, in the fifth further stator assembly 704, two longitudinal stator layers 710, four inclined stator layers 711 and two longitudinal stator layers 710 are arranged next to one another.

In the fifth further stator assembly 704, the longitudinal stator layers 710 are arranged in the third direction 15 at most on one side next to an inclined stator layer 711 and the inclined stator layers 711 are arranged in the third direction 15 at most on one side next to a longitudinal stator layer 710. In particular, in the fifth further stator assembly 704, only two longitudinal stator layers 710 are arranged in the third direction 15 next to a longitudinal inclined stator layer 711. In addition, in the third direction 15, only two inclined stator layers 711 are arranged next to a longitudinal stator layer 710.

In the fifth further stator assembly 704, all inclined stator layers 711 in the third direction 15 are arranged directly next to one another. In particular, none of the longitudinal stator layers 710 is arranged between the inclined stator layers 711. In the fifth further stator assembly 704, a first part 761 of the longitudinal stator layers 710 in the third direction 15 is arranged above the inclined stator layers 711 and a second part 762 of the longitudinal stator layers 710 in the third direction 15 is arranged below the inclined stator layers 711.

The first part 761 and the second part 762 of the longitudinal stator layers 710 each comprise an equal number of longitudinal stator layers 710. In the fifth further stator assembly 704, the first part 761 and the second part 762 each comprise two longitudinal stator layers 710.

In the third direction 15, the longitudinal stator layers 710 and the inclined stator layers 711 of the fifth further stator assembly 704 have an equal mean distance 718 from a stator surface 11 of the fifth further stator assembly 704. The arrangement of the longitudinal stator layers 710 and of the inclined stator layers 711 of the fifth further stator assembly 704 is symmetrical to a shared center plane 108 of the longitudinal stator layers 710 and of the inclined stator layers 711.

Alternative embodiments of the fourth or fifth further stator assembly 703, 704 may also comprise a larger or smaller number of inclined stator layers 711 arranged directly next to one another and/or a larger or smaller number of longitudinal stator layers 710. The first part 761 and the second part 762 of the longitudinal stator layers 710 may comprise an equal number of longitudinal stator layers 710. However, the first part 761 and the second part 762 of the longitudinal stator layers 710 may also comprise an unequal number of longitudinal stator layers 710.

The fifth further stator assembly 704 merely comprises two stator-layer changes in which the orientation of the coil conductors 125, 126 changes in the third direction 15 and in which first coil conductors 125 extending in the first direction 12 are arranged next to second coil conductors 126 extending in the second direction 14. Thus, the orientation of the coil conductors 125, 126 changes only twice in the fifth further stator assembly 704 in the third direction 15. As a result, the capacitance of the stator-layer arrangement of the fifth further stator assembly 704 is particularly low. In particular, the capacitance is lower than in a stator-layer arrangement in which longitudinal stator layers 710 and inclined stator layers 711 are alternatingly arranged in the third direction 15.

Figure 18:
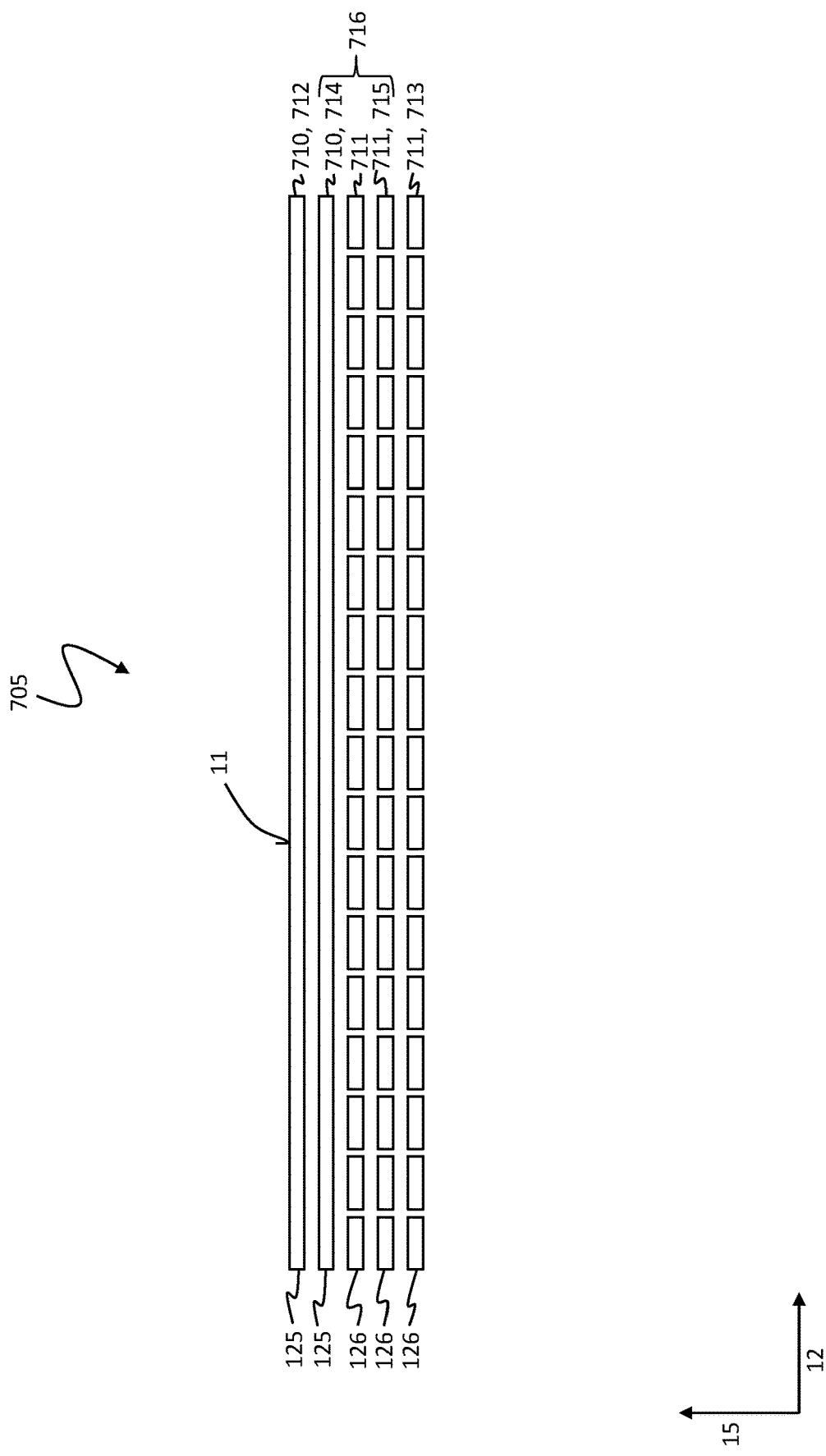
FIG. 18 shows a sixth further stator assembly for the stator module in a sectional view.

FIG. 18 shows a schematic, not-to-scale depiction of a sixth further stator assembly 705 in a sectional view, with the sectional plane oriented perpendicularly to the second direction 14. Unless differences are described, the sixth further stator assembly 705 is embodied as described for stator assembly 100.

The sixth further stator assembly 705 comprises at least two longitudinal stator layers 710 and at least three inclined stator layers 711. Unless differences are described, the longitudinal stator layer 710 and the inclined stator layers 711 of the sixth further stator assembly 705 are embodied as described for the longitudinal stator layers 710 and the inclined stator layers 711 of the stator assembly 100.

The longitudinal stator layers 710 are arranged on top of one another in the third direction 15. The inclined stator layers 711 are arranged on top of one another in the third direction 15. In the sixth further stator assembly 705, all longitudinal stator layers 710 are arranged next to each other in the third direction 15. In addition, all inclined stator layers 711 are arranged next to each other in the third direction 15. In the sixth further stator assembly 705, the longitudinal stator layers 710 are arranged at most on one side next to an inclined stator layer 711 and the inclined stator layers 711 are arranged at most on one side next to a longitudinal stator layer 710. In particular, in the sixth further stator assembly 705, only one of the longitudinal stator layers 710 is arranged next to one of the inclined stator layers 711 and only one of the inclined stator layers 711 is arranged next to one of the longitudinal stator layers 710.

The sixth stator assembly 705 comprises two longitudinal stator layers 710 and three inclined stator layers 711. The longitudinal stator layers 710 are arranged in the third direction 15 above the inclined stator layers 711. Alternative embodiments of the sixth further stator assembly 705 may also comprise a larger number of longitudinal stator layers 710 and/or a larger number of inclined stator layers 711. In particular, the alternative embodiments of the sixth stator assembly 705 may comprise an equal number of longitudinal stator layers 710 and inclined stator layers 711.

The sixth further stator assembly 705 merely comprises one stator-layer change, in which the orientation of the coil conductors 125, 126 changes in the third direction 15 and in which first coil conductors 125 extending in the first direction 12 are arranged next to second coil conductors 126 extending in the second direction 14. Thus, the orientation of the coil conductors 125, 126 changes only once in the third direction 15 for the sixth further actuator unit 705. As a result, the capacitance of the stator-layer arrangement of the sixth further stator assembly 705 is particularly low. In particular, the capacitance is lower than in a stator-layer arrangement in which longitudinal stator layers 710 and inclined stator layers 711 are arranged alternatingly in the third direction 15.

The schematic views of the previous figures show the coil conductors 125, 126 of the stator assembly 100 in each case as rectangular conductor strips extending over the entire stator sectors 110, 112, 113, 114. The coil conductors 125, 126 may be formed in areas of the stator assembly 100 remote from the connecting structures, as shown schematically in the preceding figures. However, especially in the area of the connecting structures, the shape of the coil conductors 125, 126 may also differ from the schematic representations in the preceding figures. In particular, the first coil conductors 125 in the area of the connecting structures may be narrower in the direction perpendicular to the first direction 12, in the case of the stator assembly 100 in the second direction 14, than in the areas remote from the connecting structures. Likewise, the second coil conductors 126 in the region of the connecting structures in the direction perpendicular to the second direction 14, in the case of the stator assembly 100 in the first direction 12, may be narrower than in the regions remote from the connecting structures.

The first coil conductors 125 may also be shorter in the first direction 12 than shown schematically in the previous figures. The second coil conductors 126 may also be shorter in the second direction 14 than schematically shown in the previous figures. In particular, in the first direction 12, the first coil conductors 125 of the individual first stator segments 120 need not extend completely over the first stator segments 120 and the second coil conductors 126 of the individual second stator segments 121 need not extend completely over the second stator segments 121 in the first direction 12. Horizontal connecting structures and/or vertical connecting structures may be arranged in the resulting free spaces.

All the stator assemblies 100, 700, 701, 702, 703, 704, 705 described in the figures above have in common that the first coil conductors 125 are arranged on top of one another in the third direction 15. Furthermore, the first coil conductors 125 are arranged in parallel to one another. The outer edges of the first coil conductors 125 arranged on top of one another are arranged flush on top of one another in the direction perpendicular to the first direction 12, in the case of stator assemblies 100, 700, 701, 702, 703, 704, 705 in the second direction 14. Likewise, the second coil conductors 126 of the stator assemblies 100, 700, 701, 702, 703, 704, 705 are arranged on top of one another in the third direction 15. The second coil conductors 126 are also arranged in parallel to each other. In particular, the outer edges of the second coil conductors 126 arranged on top of one another are arranged flush on top of one another in the direction perpendicular to the second direction 14, in the stator assemblies 100, 700, 701, 702, 703, 704, 705 in the first direction 12.

The respective first coil conductors 125 of the stator assemblies 100, 700, 701, 702, 703, 704, 705 arranged on top of one another are electrically conductively connected to one another in such a way that an identical coil current flows in each of the respective first coil conductors 125 positioned on top of one another. The coil current in the first coil conductors 125 arranged on top of one another in each case has particularly the same direction and the same current intensity. Thus, the first coil conductors 125 arranged on top of one another have the same electrical potential during operation of the stator assemblies 100, 700, 701, 702, 703, 704, 705. In particular, the first coil conductors 125 positioned on top of one another may be connected in series. The first coil conductors 125 arranged on top of one another may be connected in series separately from all other first coil conductors 125. However, two or more groups of first coil conductors 125 arranged on top of one another may also be connected in series, wherein the first coil conductors 125 of one or of a plurality of the groups form forward conductors in which the coil current flows in a longitudinal direction, for example in the first direction 12, and wherein the first coil conductors 125 of a further or of a plurality of the groups form return conductors in which the coil current flows with the same current intensity, but in the opposite longitudinal direction, for example opposite to the first direction 12.

The respective second coil conductors 126 of the stator assemblies 100, 700, 701, 702, 703, 704, 705 which are arranged on top of one another, are electrically conductively connected to one another in such a way that an identical coil current flows in each of the second coil conductors 126 positioned on top of one another. The coil current in the respective superimposed second coil conductors 126 arranged on top of one another in particular has the same direction and the same current intensity. As a result, the second coil conductors 126 arranged on top of one another have the same electrical potential during operation of the stator assemblies 100, 700, 701, 702, 703, 704, 705. In particular, the second coil conductors 126 positioned on top of one another may be connected in series. The second coil conductors 126 arranged on top of one another may be connected in series separately from all other second coil conductors 126. However, two or more groups of second coil conductors 126 arranged on top of one another may be connected in series, as well, the second coil conductors 126 of one or of a plurality of the groups forming forward conductors in which the coil current flows in a longitudinal direction, for example in the second direction 14, and the second coil conductors 126 of a further one or of a plurality of further ones of the groups forming return conductors in which the coil current flows with the same current intensity but in the opposite longitudinal direction, for example opposite to the second direction 14.

In all first coil conductors 125 arranged on top of one another, the coil current flows either in the first direction 12 or opposite to the first direction 12. In all second coil conductors 126 arranged on top of one another, the coil current flows either in the second direction 14 or opposite to the second direction 14. The coil currents in groups of first coil conductors 125 positioned on top of one another which are not electrically conductively connected to one another may be different. Similarly, the coil currents in groups of second coil conductors 126 arranged on top of one another which are not electrically conductively connected to each other may be different.

In the stator assemblies 100, 700, 701, 702, 703, 704, 705, a particularly small number of longitudinal stator layers 710 in the third direction 15 are next to an inclined stator layer 711. In addition, a particularly small number of inclined stator layers 711 in the third direction 15 are next to a longitudinal stator layer 710. As a result, the stator-layer arrangements of the stator assemblies 100, 700, 701, 702, 703, 704, 705 have a particularly low capacitance.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of Reference Numerals (1-240)

| | |
|---|---|
| 1 | planar-drive system |
| 8 | upper side |
| 9 | bottom side |
| 10 | stator module |
| 11 | stator surface |
| 12 | first direction |
| 14 | second direction |
| 15 | third direction |
| 18 | connecting line |
| 19 | module housing |
| 30 | outer edge of stator surface |
| 32 | side surface of stator assembly |
| 100 | stator assembly |
| 101 | upper side of stator assembly |
| 102 | bottom side of stator assembly |
| 104 | first stator layer |
| 105 | second stator layer |
| 106 | third stator layer |
| 107 | fourth stator layer |
| 108 | center plane |
| 110 | first stator sector |
| 112 | second stator sector |
| 113 | third stator sector |
| 114 | fourth stator sector |
| 120 | first stator segments |
| 121 | second stator segments |
| 125 | first coil conductor |
| 126 | second coil conductor |
| 200 | rotor |
| 201 | magnet arrangement |
| 206 | first rotor direction |
| 208 | second rotor direction |
| 210 | first magnet unit |
| 211 | first drive magnet |
| 220 | second magnet unit |
| 221 | second drive magnet |
| 230 | third magnetic unit |
| 240 | fourth magnet unit |

TABLE 2

List of Reference Numerals (700-762)

| | |
|---|---|
| 700 | first further stator assembly |
| 701 | second further stator assembly |
| 702 | third further stator assembly |
| 703 | fourth further stator assembly |
| 704 | fifth further stator assembly |
| 705 | sixth further stator assembly |
| 710 | longitudinal stator layer |
| 711 | inclined stator layer |
| 712 | uppermost stator layer |
| 713 | lowermost stator layer |
| 714 | second uppermost stator layer |
| 715 | second lowermost stator layer |
| 716 | inner layers |
| 718 | mean distance |
| 719 | next lower stator layer |
| 720 | first carrier plate |
| 721 | first longitudinal stator layer |
| 722 | first inclined stator layer |
| 723 | first side of first carrier plate |
| 724 | second side of first carrier plate |
| 725 | first vertical connecting structure |
| 726 | first conductor structure |
| 727 | further first vertical connecting structure |
| 728 | insulating layer |
| 730 | second carrier plate |
| 731 | second longitudinal stator layer |
| 732 | second inclined stator layer |
| 733 | first side of second carrier plate |
| 734 | second side of second carrier plate |
| 735 | second vertical connecting structure |
| 736 | second conductor structure |
| 737 | further second vertical connecting structure |
| 740 | third vertical connecting structure |
| 741 | fourth vertical connecting structure |
| 742 | through-hole |
| 744 | third conductor structure |
| 750 | further carrier plate |
| 753 | first side of further carrier plate |
| 754 | second side of further carrier plate |
| 756 | first further carrier plate |
| 757 | second further carrier plate |
| 758 | third further carrier plate |
| 759 | fourth further carrier plate |
| 761 | first part of longitudinal stator layers |
| 762 | second part of longitudinal stator layers |

The invention claimed is:

1. A stator assembly for driving a rotor of an electrical planar motor, wherein the stator assembly comprises:
longitudinal stator layers having first coil conductors for interacting with first drive magnets of the rotor, and
inclined stator layers having second coil conductors for interaction with second drive magnets of the rotor,
wherein the first coil conductors extend in an elongated manner in a first direction,
wherein the second coil conductors extend in an elongated manner in a second direction different from the first direction,
the longitudinal stator layers and the inclined stator layers being arranged on top of one another in a third direction oriented perpendicularly to the first and second directions,
wherein an uppermost stator layer of the stator assembly and a lowermost stator layer of the stator assembly are each embodied as a longitudinal stator layer having first coil conductors,
wherein the longitudinal stator layers are arranged in the third direction at most on one side next to an inclined stator layer, and
wherein the inclined stator layers are arranged in the third direction at most on one side next to a longitudinal stator layer.

2. The stator assembly according to claim 1, wherein a second uppermost stator layer of the stator assembly and a second lowermost stator layer of the stator assembly are each embodied as inclined stator layers having second coil conductors.

3. The stator assembly according to claim 1,
wherein the stator assembly comprises a first longitudinal stator layer and a second longitudinal stator layer, as well as a first inclined stator layer and a second inclined stator layer,
wherein the stator assembly comprises a first carrier plate extending in the first and second direction and a second carrier plate extending in the first and second direction,
wherein the first longitudinal stator layer is arranged on a first side of the first carrier plate and the first inclined stator layer is arranged on a second side of the first carrier plate opposite to the first side of the first carrier plate in the third direction,
wherein the second longitudinal stator layer is arranged on a first side of the second carrier plate and the second inclined stator layer is arranged on a second side of the second carrier plate opposite to the first side of the second carrier plate in the third direction, wherein the second carrier plate is in the third direction arranged next to the first carrier plate and is aligned in parallel to the first carrier plate, and wherein the second side of the first carrier plate is arranged facing the second side of the second carrier plate.

4. The stator assembly according to claim 3, wherein the first carrier plate comprises a first vertical connecting structure and the second carrier plate comprises a second vertical connecting structure, wherein the first vertical connecting structure extends in the third direction from the first side of the first carrier plate to the second side of the first carrier plate and electrically conductively connects a first coil conductor arranged on the first side of the first carrier plate to a first conductor structure arranged on the second side of the first carrier plate, and wherein the second vertical connecting structure extends in the third direction from the second side of the second carrier plate to the first side of the second carrier plate and electrically conductively connects a first coil conductor arranged on the first side of the second carrier plate to a second conductor structure arranged on the second side of the second carrier plate.

5. The stator assembly according to claim 4, wherein the stator assembly comprises a third vertical connecting structure, and wherein the third vertical connecting structure electrically conductively connects a first coil conductor arranged on the first side of the first carrier plate to a third conductor structure arranged on the second side of the second carrier plate.

6. The stator assembly according to claim 5, wherein the third vertical connecting structure comprises a through-hole extending in the third direction from an upper side of the stator assembly to a bottom side of the stator assembly.

7. The stator assembly according to claim 4, wherein the stator assembly comprises further carrier plates extending in the first and second direction, wherein the further carrier plates each have a first side and a second side opposite to the first side in the third direction, wherein a longitudinal stator layer is respectively arranged on the first side of the further carrier plates and an inclined stator layer is respectively arranged on the second side of the further carrier plates, wherein the first carrier plate, the second carrier plate and the further carrier plates are arranged side by side and are aligned in parallel to each other in the third direction, and wherein facing sides of carrier plates arranged next to one another are alternatingly embodied as facing first sides or as facing second sides in the third direction.

8. The stator assembly according to claim 1, wherein the stator assembly comprises at least two longitudinal stator layers having first coil conductors and at least three inclined stator layers having second coil conductors, wherein all inclined stator layers are arranged next to one another in the third direction, and wherein a first part of the longitudinal stator layers is in the third direction arranged next to one another and above the inclined stator layers and a second part of the longitudinal stator layers is in the third direction arranged next to one another and below the inclined stator layers.

9. The stator assembly according to claim 8, wherein the first part of the longitudinal stator layers and the second part of the longitudinal stator layers comprise an equal number of longitudinal stator layers.

10. The stator assembly according to claim 1, wherein the first direction and the second direction are oriented perpendicularly to each other.

11. The stator assembly according to claim 1, wherein in the third direction the longitudinal stator layers and the inclined stator layers have the same central distance from a stator surface of the stator assembly.

12. The stator assembly according to claim 1, wherein a first total number of longitudinal stator layers corresponds to a second total number of inclined stator layers.

13. The stator assembly according to claim 1, wherein the first coil conductors are arranged on top of one another and in parallel to each other in the third direction, and wherein the second coil conductors are arranged on top of one another and in parallel to one another in the third direction.

14. The stator assembly according to claim 13, wherein first coil conductors arranged on top of one another in the third direction are each electrically conductively connected to one another in such a way that a similar coil current flows in each of the first coil conductors positioned on top of one another, and wherein second coil conductors arranged on top of one another in the third direction are each electrically conductively connected to one another in such a way that an identical coil current flows in each of the second coil conductors positioned on top of one another.

15. The stator assembly according to claim 14, wherein the first coil conductors arranged on top of one another are each electrically connected in series, and wherein the second coil conductors arranged on top of one another are each electrically connected in series.

16. A stator assembly for driving a rotor of an electrical planar motor, wherein the stator assembly comprises:

at least two longitudinal stator layers having first coil conductors for interacting with first drive magnets of the rotor, and at least three inclined stator layers having second coil conductors for interacting with second drive magnets of the rotor, wherein the first coil conductors extend in an elongated manner in a first direction, wherein the second coil conductors extend in an elongated manner in a second direction different from the first direction, the longitudinal stator layers and the inclined stator layers being arranged on top of one another in a third direction oriented perpendicularly to the first and second directions, wherein all longitudinal stator layers are arranged next to each other in the third direction, and wherein all inclined stator layers are arranged next to each other in the third direction, so that each inclined stator layer is in the third direction arranged at most on one side next to a longitudinal stator layer and each longitudinal stator layer is in the third direction arranged at most on one side next to an inclined stator layer.

17. A stator module for an electrical planar motor having:

a stator assembly for driving a rotor, wherein the stator assembly comprises longitudinal stator layers having first coil conductors for interacting with first drive magnets of the rotor and inclined stator layers having second coil conductors for interacting with second drive magnets of the rotor,
wherein the first coil conductors extend in an elongated manner in a first direction,
wherein the second coil conductors extend in an elongated manner in a second direction different from the first direction,
  the longitudinal stator layers and the inclined stator layers being arranged on top of one another in a third direction oriented perpendicularly to the first and second direction,
wherein an uppermost stator layer of the stator assembly and a lowermost stator layer of the stator assembly are each formed as a longitudinal stator layer having first coil conductors,
wherein the longitudinal stator layers are arranged in the third direction at most on one side next to an inclined stator layer, and
wherein the inclined stator layers are arranged in the third direction at most on one side next to a stator longitudinal length.

\* \* \* \* \*